(12) United States Patent
Handa

(10) Patent No.: US 7,891,386 B2
(45) Date of Patent: *Feb. 22, 2011

(54) THERMAL MANAGEMENT FOR HIGH PRESSURE STORAGE TANKS

(76) Inventor: Kiyoshi Handa, Honda R&D Americas, Inc., 21001 State Route 739, Raymond, OH (US) 43067-9705

( * ) Notice: Subject to any disclaimer, the term of this patent is extended or adjusted under 35 U.S.C. 154(b) by 815 days.

This patent is subject to a terminal disclaimer.

(21) Appl. No.: 11/687,905

(22) Filed: Mar. 19, 2007

(65) Prior Publication Data

US 2008/0302110 A1 Dec. 11, 2008

Related U.S. Application Data

(63) Continuation-in-part of application No. 11/682,574, filed on Mar. 6, 2007, now Pat. No. 7,735,528, which is a continuation-in-part of application No. 11/279,574, filed on Apr. 13, 2006, now Pat. No. 7,377,294, and a continuation-in-part of application No. 11/380,429, filed on Apr. 27, 2006, now Pat. No. 7,637,292, and a continuation-in-part of application No. 11/381,005, filed on May 1, 2006, now Pat. No. 7,681,604, and a continuation-in-part of application No. 11/380,996, filed on May 1, 2006, now Pat. No. 7,757,726.

(51) Int. Cl.
*B65B 1/04* (2006.01)

(52) U.S. Cl. ....................................................... 141/82

(58) Field of Classification Search .................. 141/82, 141/2, 18, 98, 286, 67; 62/50.1–50.5; 123/525; 137/255, 263; 272/146.1, 146.6
See application file for complete search history.

(56) References Cited

U.S. PATENT DOCUMENTS

| 7,377,294 | B2 * | 5/2008 | Handa | 141/82 |
| 7,735,528 | B2 * | 6/2010 | Handa | 141/82 |

* cited by examiner

*Primary Examiner*—Steven O Douglas
(74) *Attorney, Agent, or Firm*—Mark E. Duell; Porter Wright Morris & Arthur, LLP

(57) ABSTRACT

Apparatus for the thermal management of high pressure gas storage tanks wherein the compression heat of refueling the tank is evacuated from the interior of the tank in which a gas circulates within the tank powered by a pump powered and as the gas traverses from the high pressure refuel depot to the storage tank, the circulating gas absorbs the refueling heat and carries the heat to a cooling system having a supplemental heat exchange device before the gas is introduced into the tank. The apparatus may be operated in reverse to transfer heat from a source to the tank interior to provide more complete exhaustion of the tank during vehicle operation.

15 Claims, 21 Drawing Sheets

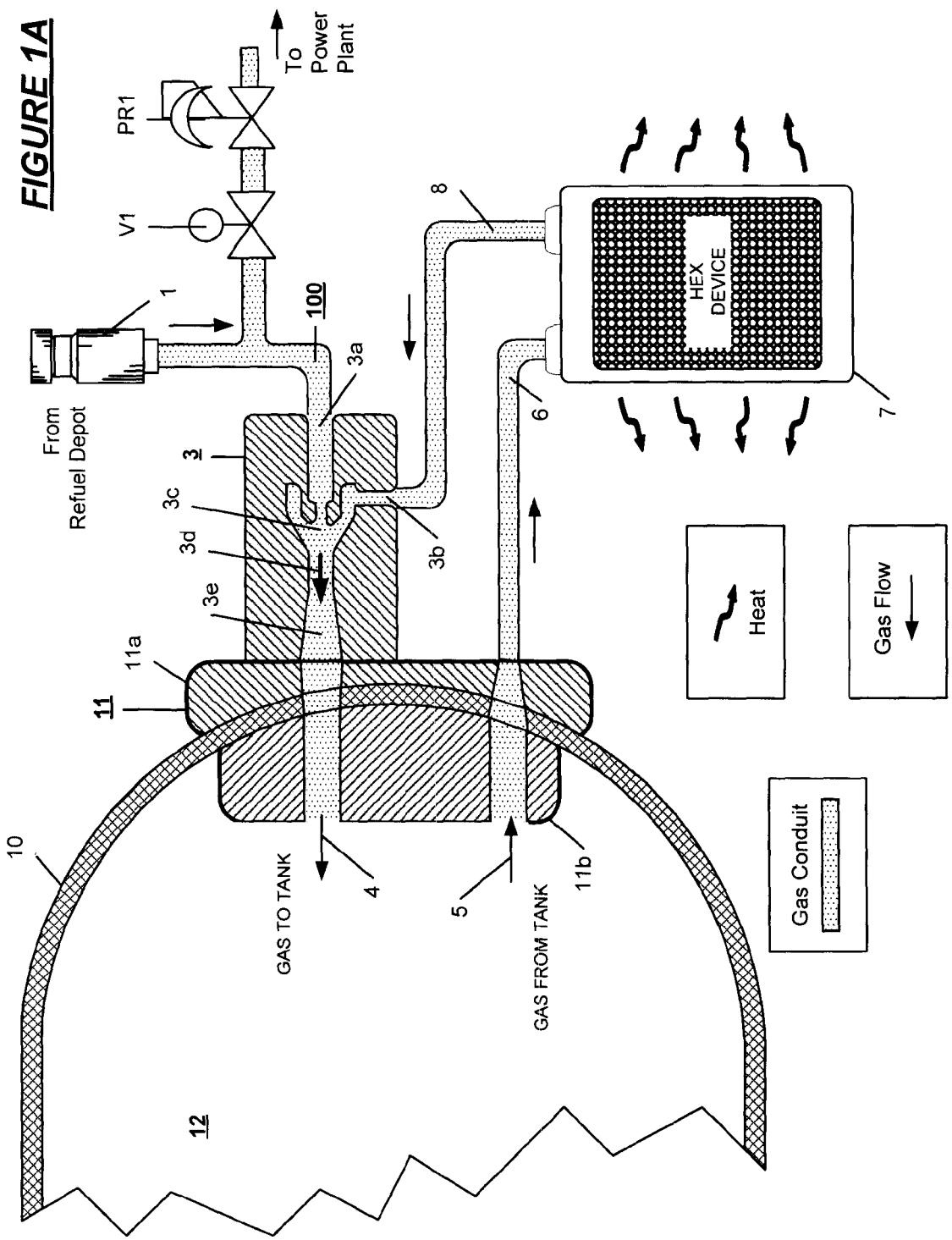

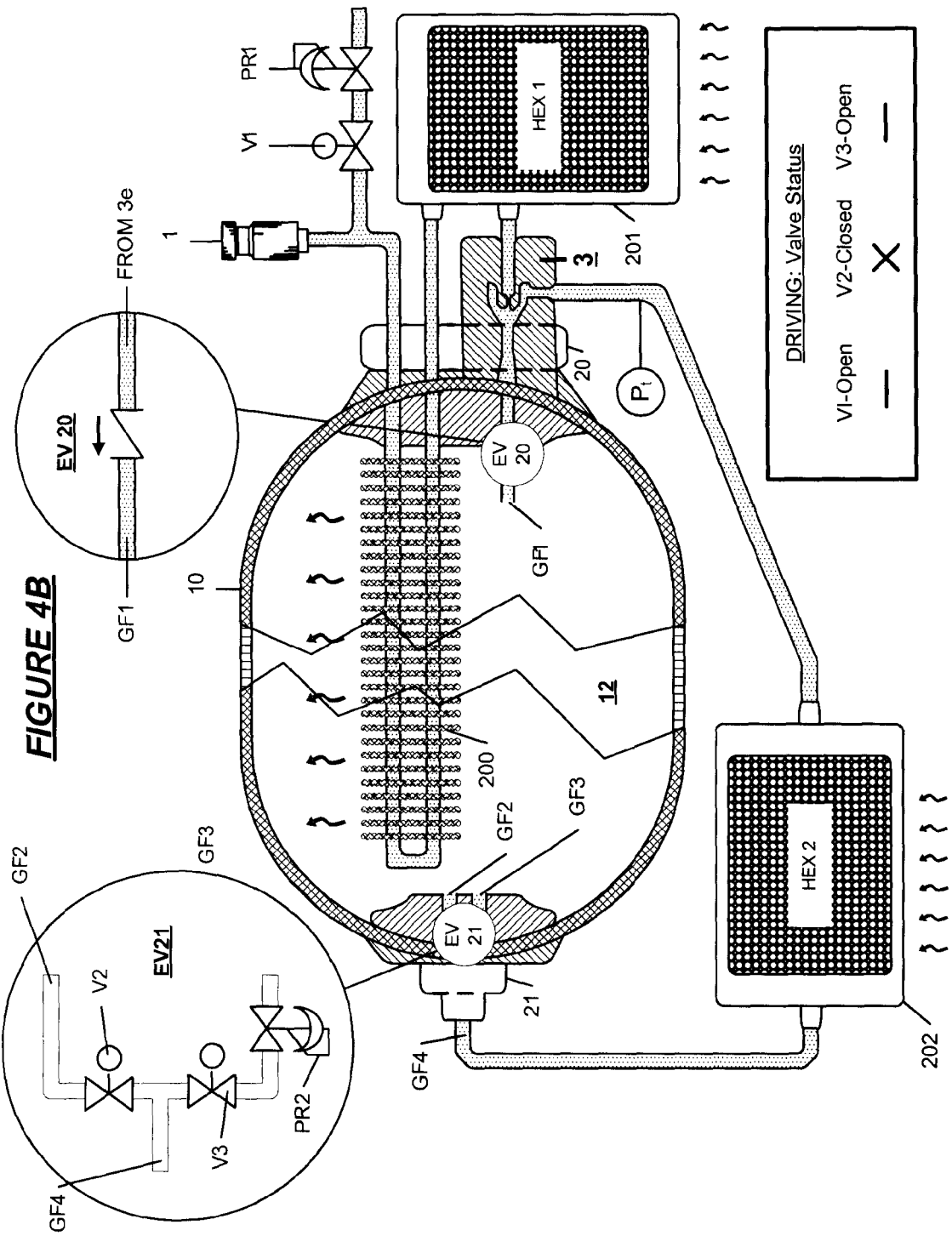

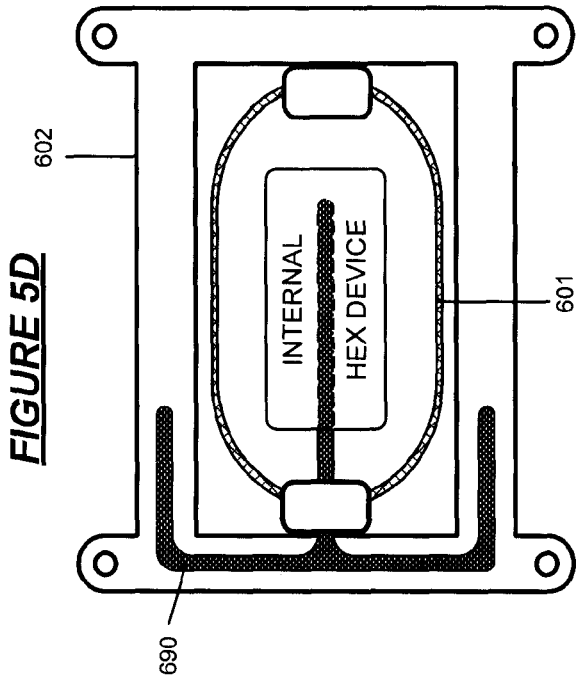
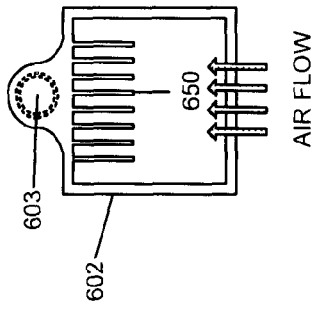
*FIGURE 5D*
*FIGURE 5B*
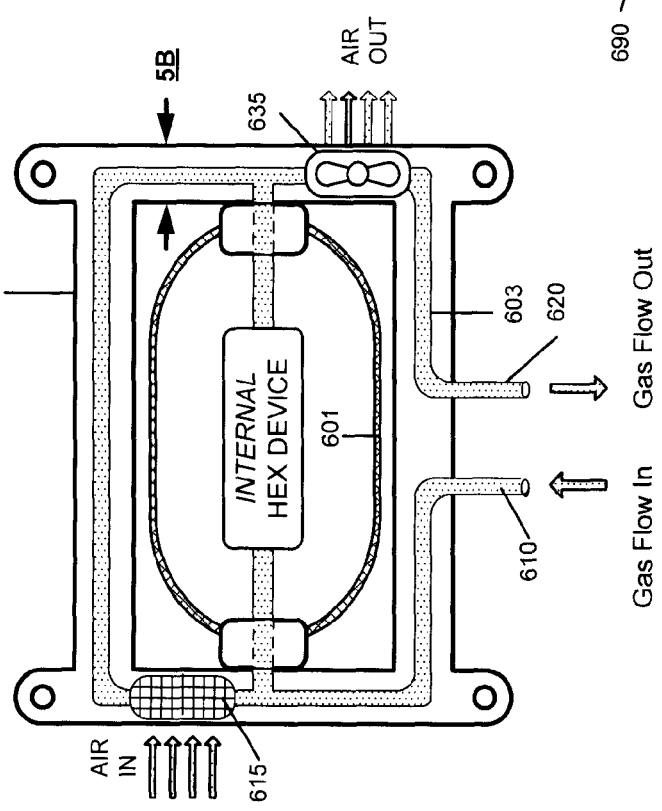
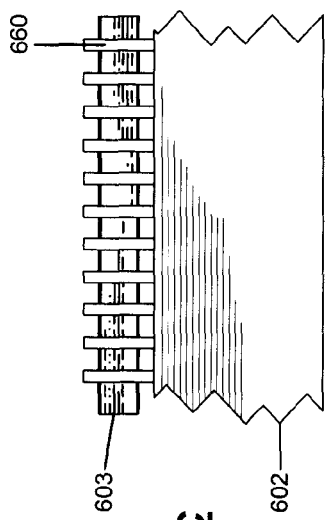
*FIGURE 5A*
*FIGURE 5C*

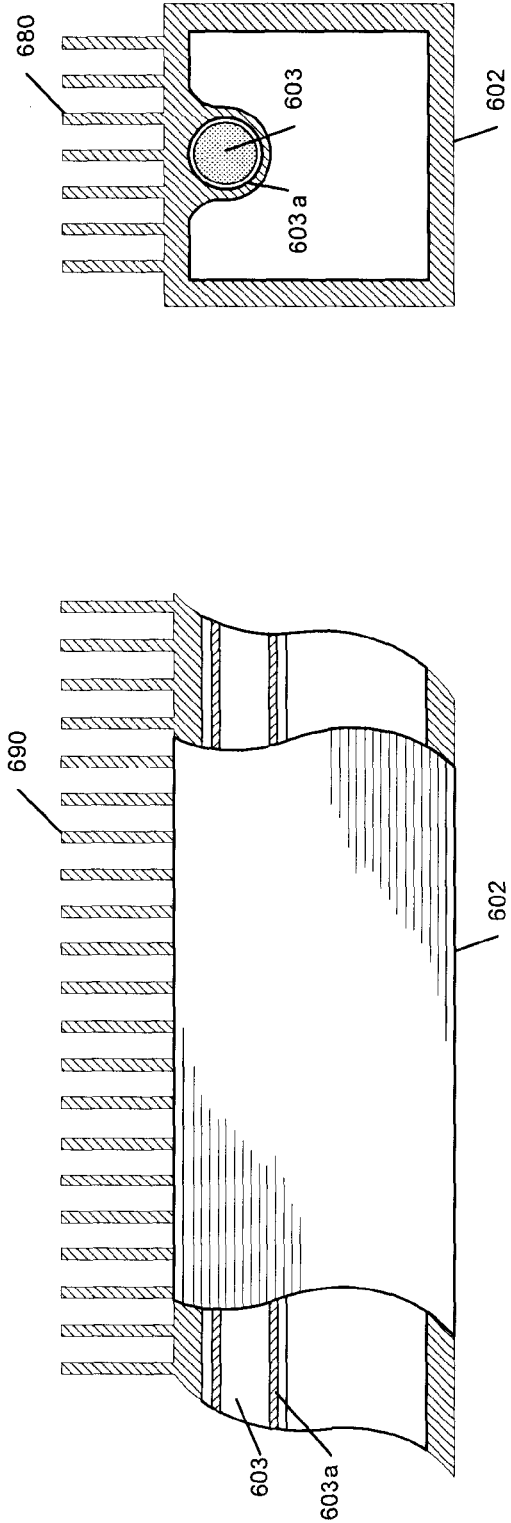
FIGURE 5F
FIGURE 5E
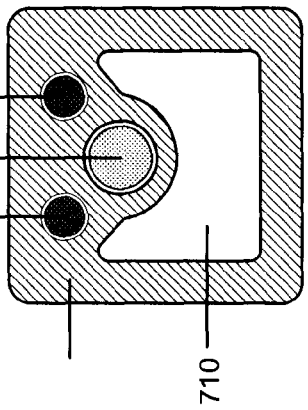
FIGURE 5H
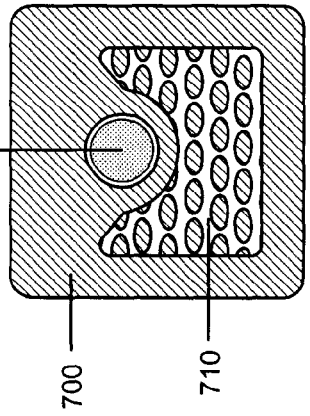
FIGURE 5G

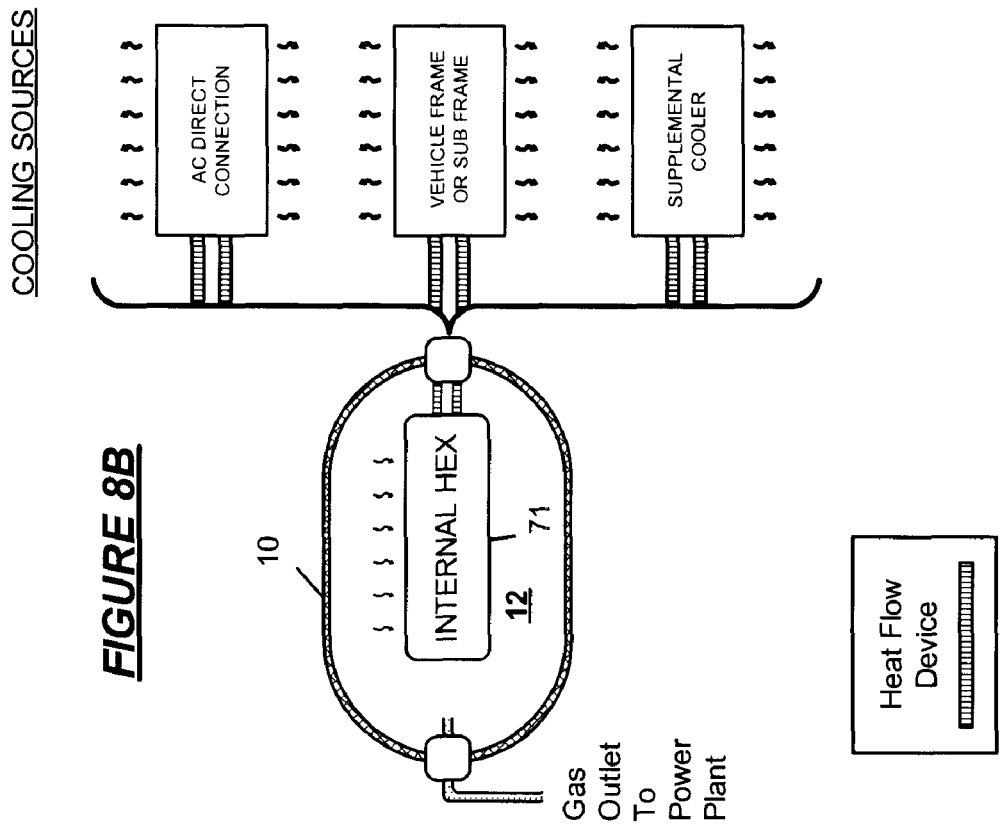
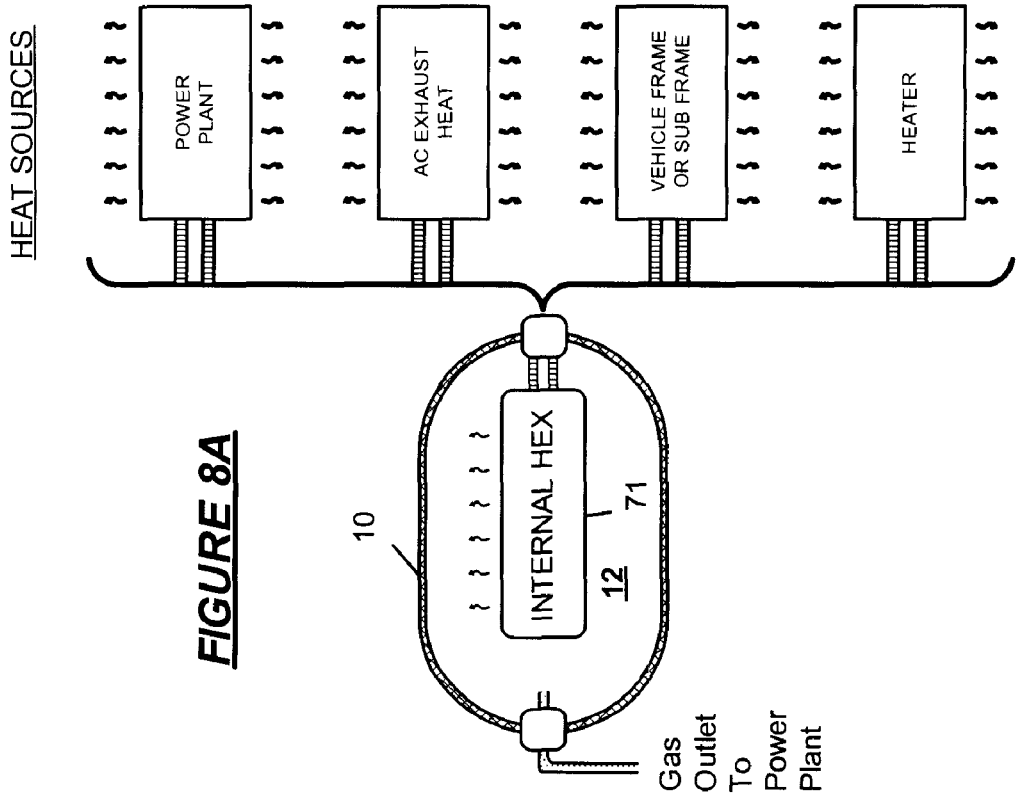

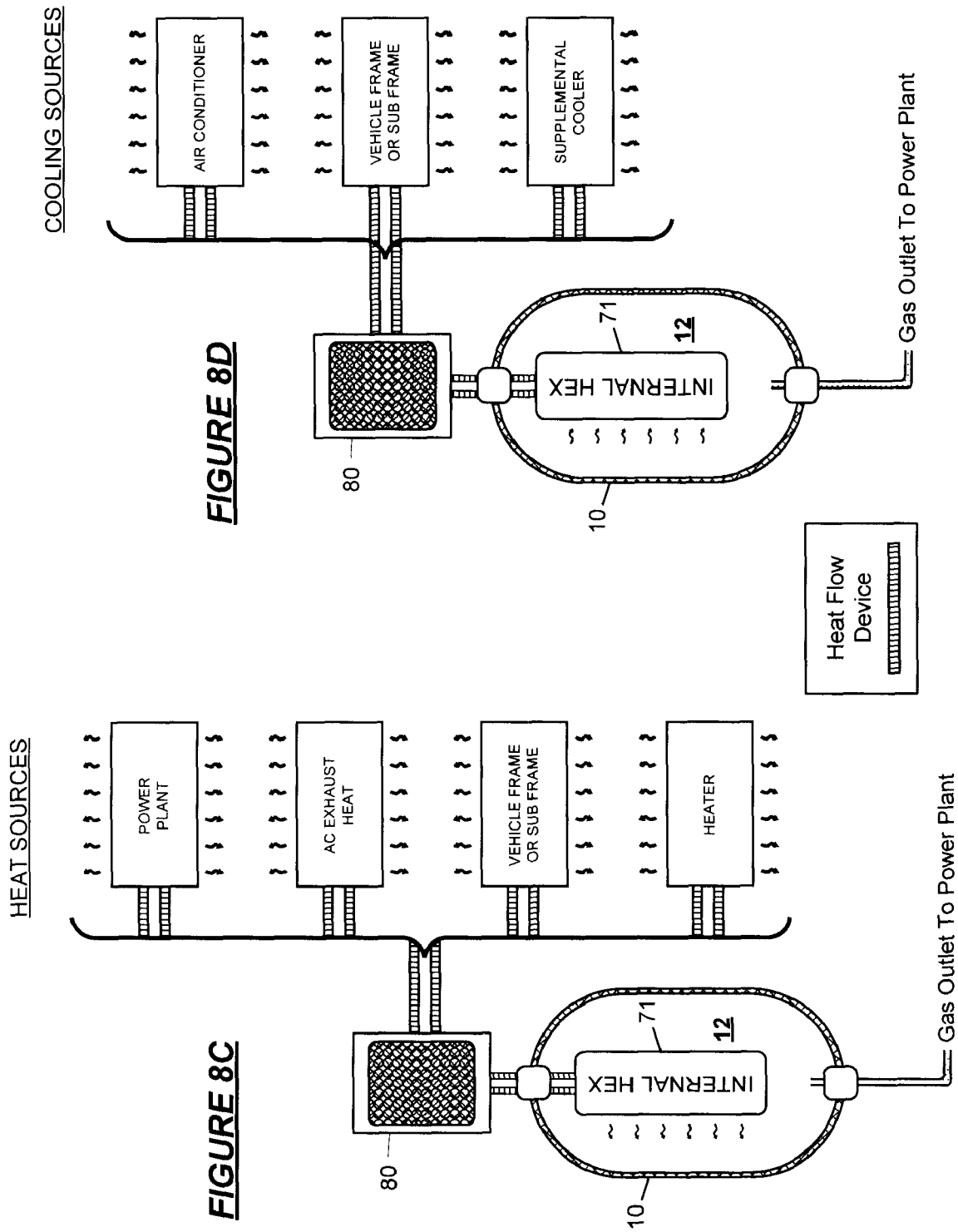

THERMAL MANAGEMENT FOR HIGH PRESSURE STORAGE TANKS

RELATED APPLICATIONS

This application is a continuation in part of my application for U.S. Letters patent Ser. No. 11/682,574 filed Mar. 6, 2007, now U.S. Pat. No. 7,735,528, which is a continuation in part of U.S. patent application Ser. No. 11/279,574, filed Apr. 13, 2006, now U.S. Pat. No. 7,377,294, U.S. patent application Ser. No. 11/380,429 filed Apr. 27, 2006, now U.S. Pat. No. 7,637,292, U.S. patent application Ser. No. 11/381,005 filed May 1, 2006, now U.S. Pat. No. 7,681,604, and U.S. patent application Ser. No. 11/380,996 filed May 1, 2006, now U.S. Pat. No. 7,757,726.

FIELD OF THE INVENTION

The present invention relates to a system for cooling high pressure gas stored in fuel tanks, typically, hydrogen gas and compressed natural gas introduced to the tank at a refueling station. Onboard high pressure tank cooling is effected by direct gas ejecting using a Venturi pump or another mechanical pump to circulate refill gas to absorb heat within and to transfer absorbed heat to an environment external to the tank.

BACKGROUND OF THE INVENTION

In motor vehicles using hydrogen or using compressed natural gas (CNG) to power vehicle engines, present practice is that fuel is stored in on board tanks maintained at a maximum pressure in the range of about 5000 psi for hydrogen and 3600 psi for CNG. Higher pressures in the range of about 10,000 psi or more are anticipated as the use of hydrogen (for fuel cells) and hydrogen and CNG (for internal combustion engines) becomes more prevalent. The in situ techniques I have developed to the manage thermal energy differences between high pressure gas in a tank and the environment of the tank in a vehicle involve heat exchanger devices fixed within the tank (to absorb and radiate heat) operatively interconnected with an external heat exchanger (correlatively to radiate and absorb heat) in the sequence of the refill and exhaustion of the high pressure gas within the tank. In the specification herein, high pressure hydrogen and high pressure CNG (compressed natural gas) are both referred to as a "gas" or "high pressure gas." Both hydrogen and CNG are high pressure gases with which the invention is useful, typically, but not necessarily, in motor vehicle applications.

When the on board fuel tanks of a hydrogen powered vehicle are filled with hydrogen, the pressurized on board gas in the tanks may be characterized as having multiple forms of energy: 1) chemical energy associated with the hydrogen fuel itself (consumed in powering the vehicle), and 2) thermodynamic energy, namely, the mechanical, thermal and internal energy associated with the physics of high pressure refueling of a tank from sources of fuel at the high pressure gas refuel depot.

During a high pressure refueling process involving hydrogen and CNG fueled vehicles, gas within the interiors of the on board storage tanks become heated as a result of fuel gas compression when the tank pressure increases and other refueling parameters affect the refill. After refueling, the interior temperature of the gas within the tank and the pressure within the tank both decrease slowly as the fuel gas is consumed during vehicle operation. Conventionally, it is not possible to obtain a full refill tank pressure without temperature or pressure compensation during the course of refueling. The charge of fuel pressure input into and stored in the tank must be, at refill (because of the heating compression of the gas), initially in excess of the tank design pressure. Without pressure compensation (an initial overfill), vehicle mileage range is reduced because a full fill is not obtained. When higher optimum tank design pressures are encountered, this condition is exacerbated.

Slower flow rates, a pressure overfill and external precooling have been proposed as solutions, however, the former undesirably extends the time of a refill, the latter two require substantial energy, thereby reducing the overall efficiency of a hydrogen/CNG economy. As tank pressures exceed 3600 psi (for CNG) and 5000 psi and approach or exceed 10,000 psi (for hydrogen), secondary treatment such as cooling becomes an important factor in the refueling process to achieve a full tank capacity fill. When a full fill is achieved, 1) overall vehicle range per each tank refill thereby increases, 2) energy required for a refill (such as for precooling or a pressure overfill) is reduced, 3) time is saved, and 4) overall customer satisfaction increases.

OBJECTS OF THE INVENTION

It is an object of the invention to minimize high pressure gas tank heating and to increase the efficiency and refueling capacity of an on board fuel storage tank in high pressure gas powered motor vehicles and the gas utilization thereof. It is an object of the invention to provide a system that can remove the compression heat resulting from refueling an on board tank during high pressure refueling. An avoidance of secondary gas cooling pretreatment and/or pressure overfill, a speedier refueling time, increased refueling efficiency, and an extension of overall vehicle range will result. Improved tank capacity per unit volume is achieved during refilling, particularly where nominal refill pressure is in the range of about 10,000 psi or greater for hydrogen and about 3,600 psi for CNG. It is also an object of the invention to utilize the cooling system in reverse, namely, to provide heat to the gas within the tank as the tank cools during operation that lowers the tank pressure. When the gas is heated, a benefit results that additional gas can be evacuated from the tank, further increasing the range of vehicle operation.

SUMMARY OF THE INVENTION

In accordance with the present invention, effective reduction of fuel tank heating during the refueling process is provided by introducing the refueling gas into a Venturi (or ejector) pump system that sucks out the hot gas from within the tank and in a circuit introduces the hot gas into a heat exchanger where the gas is then cooled down. The cooled gas and the refueling gas are mixed in the ejector and then both gas streams are directed into the vehicle storage tank. Alternatively, a mechanical circulation system may utilize the flow of gas in a circuit to absorb and dispose of excess heat associated with refueling.

The system described herein provides onboard cooling; as a result, there is no need to change the refueling station equipment. The cost and weight of on board gas cooling equipment, important factors in the adoption of high pressure fueled vehicles, are reduced. Cooling capacity is improved; continuous cooling is provided. Heat exchange efficiency approaches 100%. When there is an internal heat exchanger, the gas temperature in the heat exchanger is not perfectly equal to tank gas temperature, thus reducing internal heat exchanger efficiency to less than 100%. In the gas ejector system described herein, the gas flow cooling circuit, through an in situ device or a Venturi pump is interconnected with an external heat radiator or a vehicle sub cooling system such as an air conditioner, thereby collecting interior tank heat and radiating the absorbed heat into the ambient atmosphere or other system appropriate for the use, radiation, absorption, or disposal of the collected heat of high pressure refueling. Utilized in reverse, the cooling devices will heat the tank gas while the vehicle is being operated and increase gas utilization in a refill.

The invention is described more fully in the following description of the preferred embodiment considered in view of the drawings. As is evident from the context of the particular drawing figures, the figures are generally shown in cross section format:

BRIEF DESCRIPTION OF THE SEVERAL VIEWS OF THE DRAWINGS

FIG. 1A shows an example of an ejector (Venturi) pump cooling system with the pump at one end of a fuel storage tank wherein gas flows through an external radiator.

FIG. 4A, FIG. 4B, and FIG. 4C respectively depict embodiments of the invention utilizing an ejector pump circulator and (1) an in situ tank HEX for heat transfer and (2) first HEX and (3) second HEX devices, particularly showing tank valve and pressure regulator configurations in the gas flow circuits during the states in which the tank is being refilled (FIG. 4A), during driving (FIG. 4B) and while the vehicle is parked (FIG. 4C).

FIG. 5A, FIG. 5B, FIG. 5C, FIG. 5D, FIG. 5E, FIG. 5F, FIG. 5G and FIG. 5H respectively show (A) a heat transfer system utilizing a vehicle frame component, (B) a cross section through 5B→←5B in the frame element shown in FIG. 5A, (C) a side view of an alternate flow conduit adapted to a frame element, (D) a heat pipe interconnected with a tank support frame and a tank in situ device, (E) a side view of a gas flow conduit embedded in a frame member, (F) a cross section view of the member shown in FIG. 5E, (G) a gas flow conduit embedded in a frame member having a further melting/solidifying heat transfer media such as naphthalene therein, and (H) a cross section of a vehicle frame member having gas flow and coolant flow conduits embedded therein.

FIG. 8A shows the tank in situ HEX utilized in reverse conveying heat from "warm" devices in the vehicle to provide heat to the tank gas in a direct transfer to the in situ HEX within the tank. FIG. 8B shows the connection if the in situ HEX within the tank where heat is absorbed and then transferred to vehicle cooling systems, or a heat sink, where heat is radiated.

FIG. 8C shows the tank in situ HEX utilized in reverse conveying heat from "warm" devices in the vehicle to the tank gas in an indirect transfer wherein a HEX associated with the heat sources is interposed between the in situ HEX and the heat sources. FIG. 8D shows vehicle cooling sources, or heat sinks, indirectly connected to the in situ device through a supplemental HEX.

DETAILED DESCRIPTION OF THE INVENTION

Figure 1B:
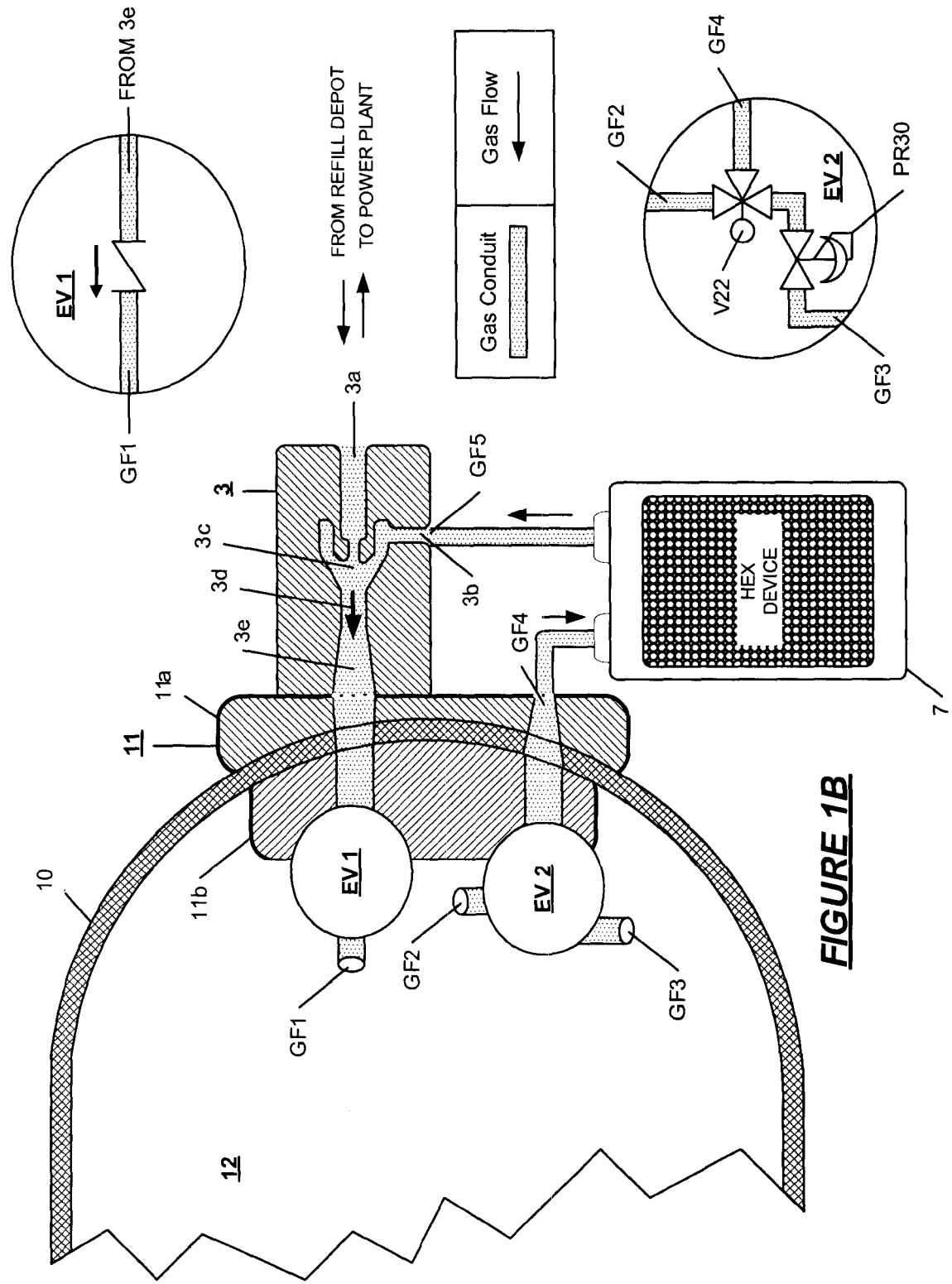
FIG. 1B shows an embedded valve gas flow system utilized in the system of FIG. 1A.

The system of the invention increases the refueling energy efficiency of high pressure gas powered (Hydrogen and CNG) vehicles by withdrawing the heat of compression resulting from tank refilling from the high pressure gas introduced into on board tanks and by eliminating the need for a slow fill, a pressure overfill and/or refueling station precooling of the gas. Overall, high pressure gas infrastructure energy requirements for motor vehicles are reduced, vehicle mileage range is increased when tank capacity is expanded, the need for short interval refills is eliminated, vehicle weight and cost are reduced, and consumer satisfaction is enhanced.

With reference to FIG. 1A an example of a cooling system using an ejector pump fixed at one end cap or port assembly 11 comprised of mating elements 11a and 11b of a fuel storage tank 10 having interior gas storage volume 12 is shown. An ejector pump 3 is installed at the cap assembly providing a gas flow circuit 100 within the system from the refill depot receptacle 1. Fuel depot receptacle 1 is interconnected with a control for gas flow into the vehicle tank during refill and insures that the system is otherwise closed at all other times. The master gas flow conduit system in the vehicle from the refuel inlet through the ejector pump and heat exchanger to the tank is indicated by 100. At refill, gas flow from the refill depot, indicated by arrows →, enters the tank volume 12 through inlet 4. Gas is introduced into ejector pump 3 which sucks up the introduced hot gas from the tank interior through tank gas flow outlet 5. Ejector pump 3 is configured to provide gas flow from the inlet 3a whereby jet chamber throat 3d follows the nozzle 3c that leads from the inlet 3a. The pump diffuser 3e is disposed to introduce gas from the pump into the tank interior through gas flow conduit 4 in the tank. The suction inlet for gas flow to the pump is shown at 3b. The gas flow is interconnected to inlet 6 of external radiator or heat exchanger (HEX) 7 and passes through HEX outlet 8 returning to the ejector pump suction inlet 3b and flows to the tank interior 12 through tank inlet 4.

A gas outlet for directing the flow of gas to the power plant while the vehicle is in operation is shown at valve V1 which leads to the power plant through pressure regulator PR1. Heat disposal from the heat exchanger is indicated by the arrows ⟶. The compression heat caused by a high pressure refill is thereby absorbed by the gas itself which circulates within conduits 100 and is radiated from the cooling/refueling circuit to an external environment through the HEX 7 such that a close to optimum refill of the tank is achieved without a slow fill, precooling or pressure overfill. In FIG. 1B, control valves and regulators embedded in the end caps of the embodiment of FIG. 1A are indicated as assemblies EV 1 and EV2. EV1 is shown in further detail as including a check, or one way flow, valve leading to gas flow inlet GF1 in the tank interior. Valve and regulator assembly EV2 includes two way switching valve V22 and pressure regulator PR30 leading to gas flow openings GF2 and GF 3 in the tank interior and opening GF4 at the tank exterior. Heat exchanger 7 is shown in the gas flow circuit receiving gas from the tank through GF4 and introducing cooled gas into the ejector pump suction inlet 3b through opening GF5.

Figure 2A:
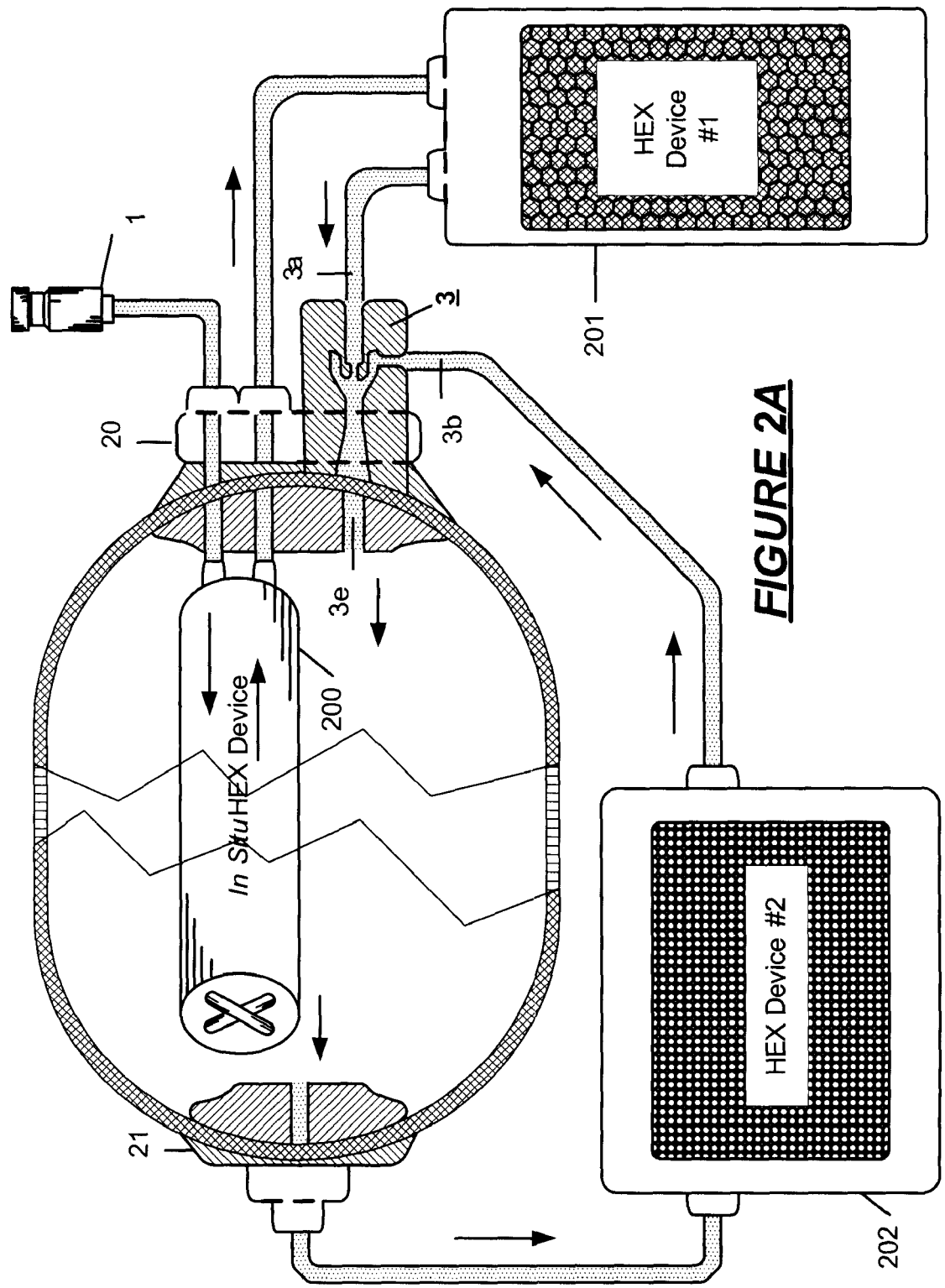
FIG. 2A depicts an embodiment of the invention utilizing an ejector pump gas flow system interconnected in circuits for gas flow from the refill depot through (1) an in situ heat exchange device (HEX), (2) a first external HEX and (3) a second HEX.
Figure 2B:
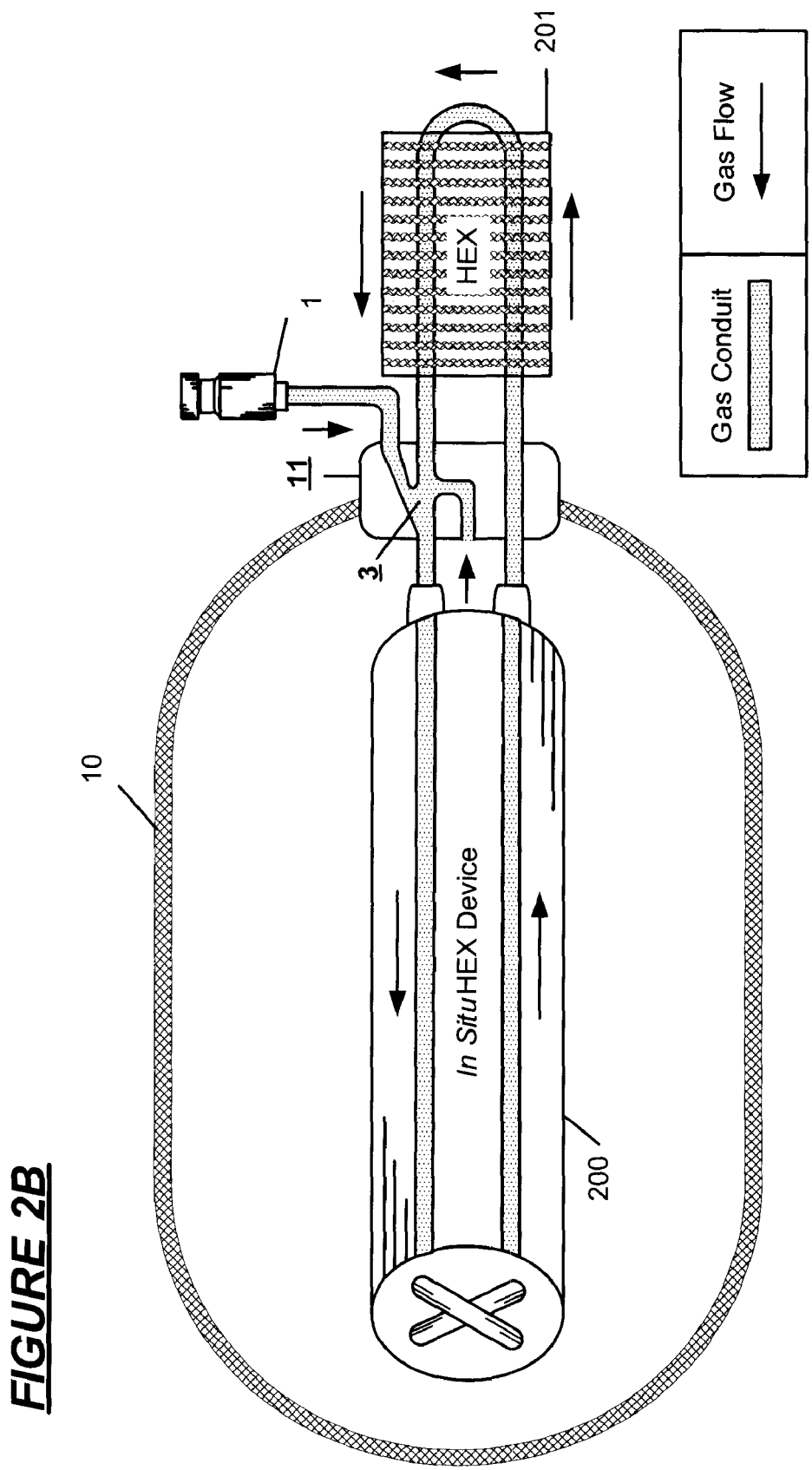
FIG. 2B depicts an additional Venturi pump circulation system utilizing an in situ device and an external HEX.
Figure 2C:
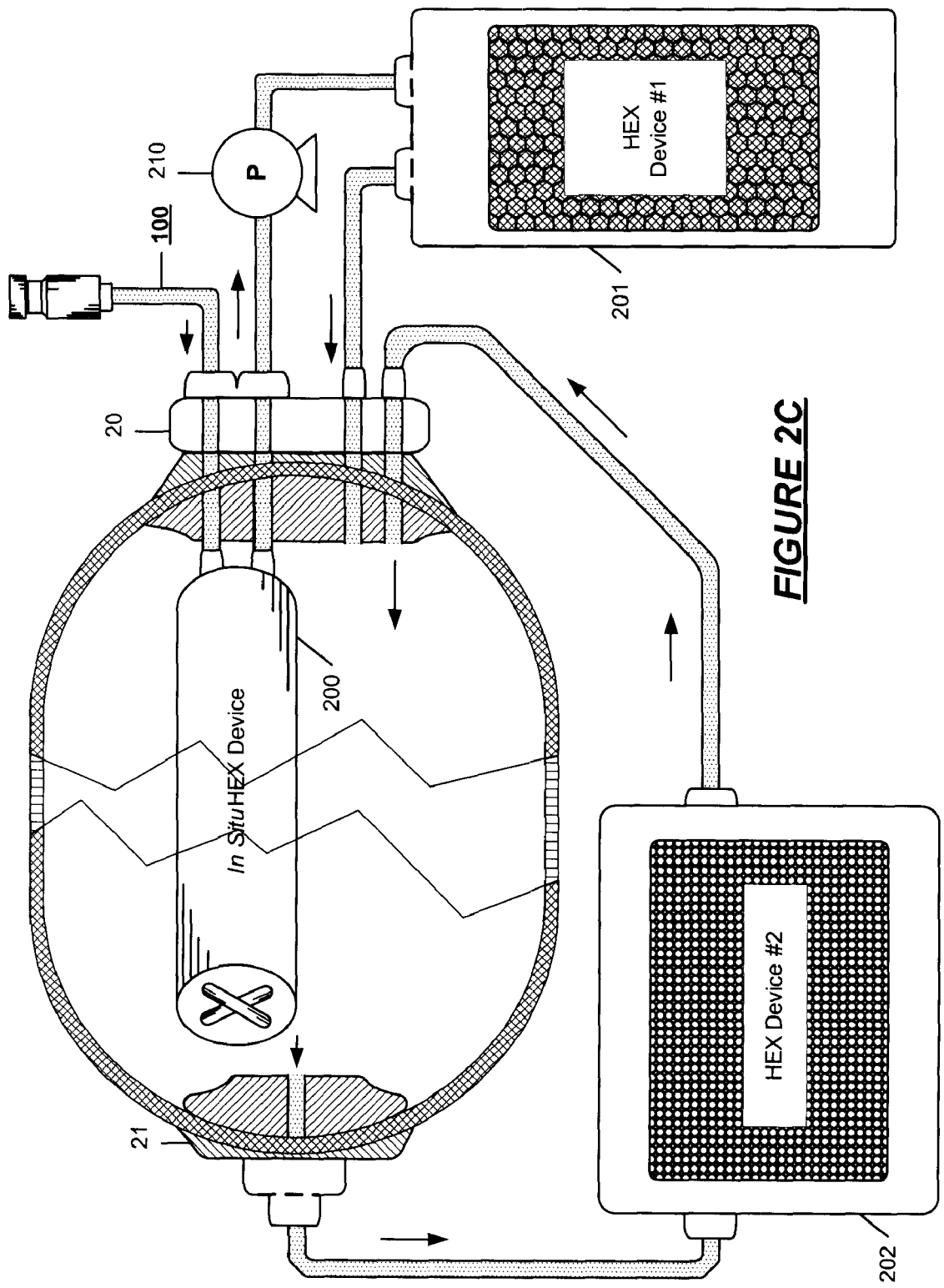
FIG. 2C depicts an embodiment of the invention otherwise shown in FIG. 2A wherein a powered pump is utilized in place of the self powered ejector pump.

In FIG. 2A an end cap or tank port or boss assembly is adapted to each opposite ends of the tank at 20 and 21 in a configuration wherein gas introduced from refill depot 1 circulates in a loop through in situ device 200 installed within the tank, through first external heat exchanger 201 into the ejector pump inlet 3a and circulates through the tank from ejector outlet 3e, then through second external heat exchanger 202 before being introduced to ejector pump suction inlet 3b and delivered into the tank. The ejector pump is indicated at 3. In FIG. 2B, a port assembly is similarly adapted to each opposite end of the tank at 20 and 21 in a configuration wherein gas introduced from refill depot 1 circulates in a loop through in situ device 200, first external heat exchanger 201 and second external heat exchanger 202 before being introduced into the tank at the end of the circulation loop. In this example, the gas flow 210 is powered mechanically by turbine flow of the high pressure gas interconnected to a gas pump, by an electrically powered pump, or by a pump otherwise interconnected to the vehicle power plant mechanicals. In both FIG. 2A and FIG. 2B, gas flow is indicated by the arrows, →.

Figure 3A:
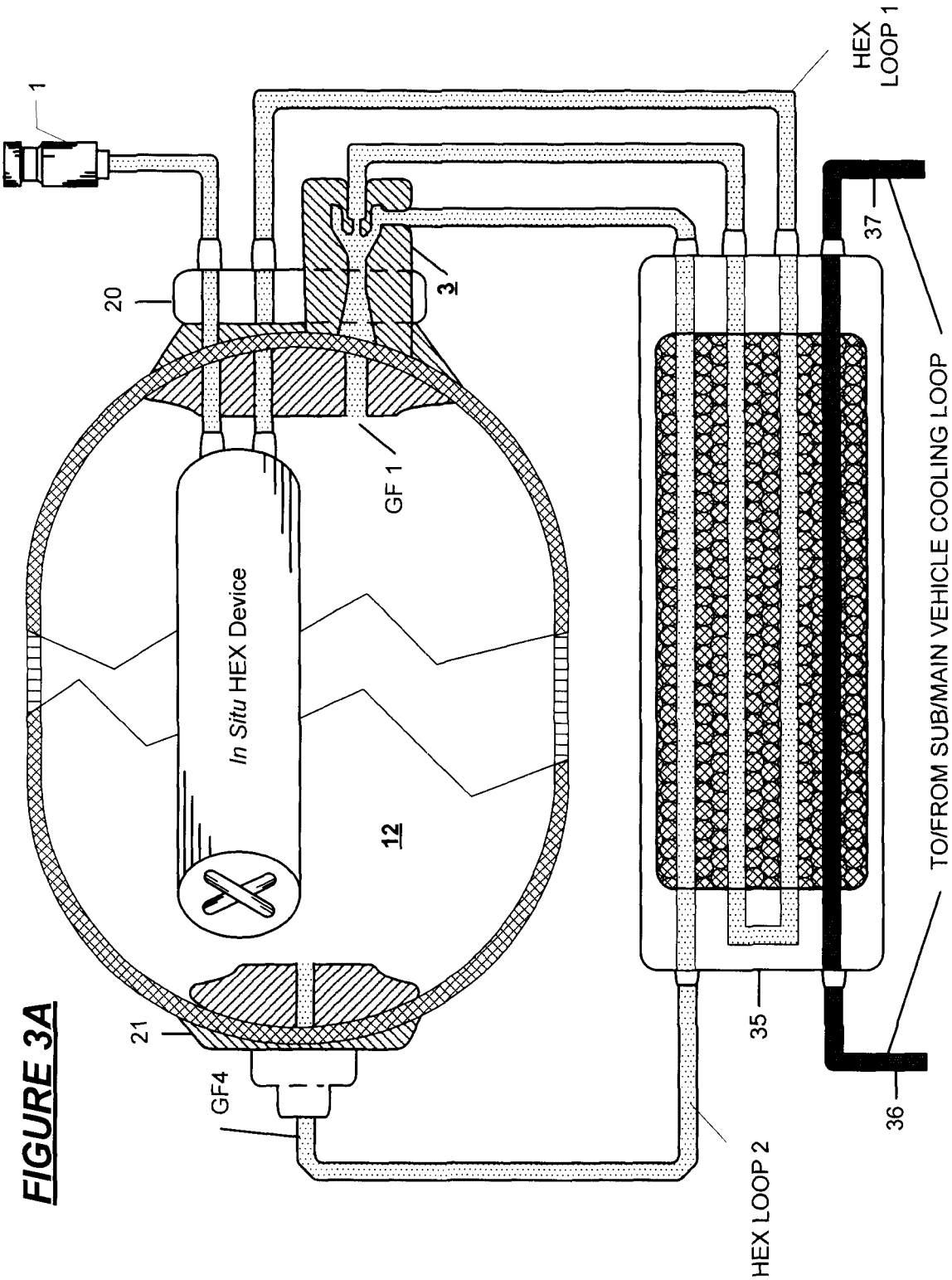
FIG. 3A illustrates a system of the invention in which the gas flow circuits are thermally interconnected to a main or sub vehicle cooling system or radiator HEX for the disposition of the heat absorbed by the circulating gas.
Figure 3B:
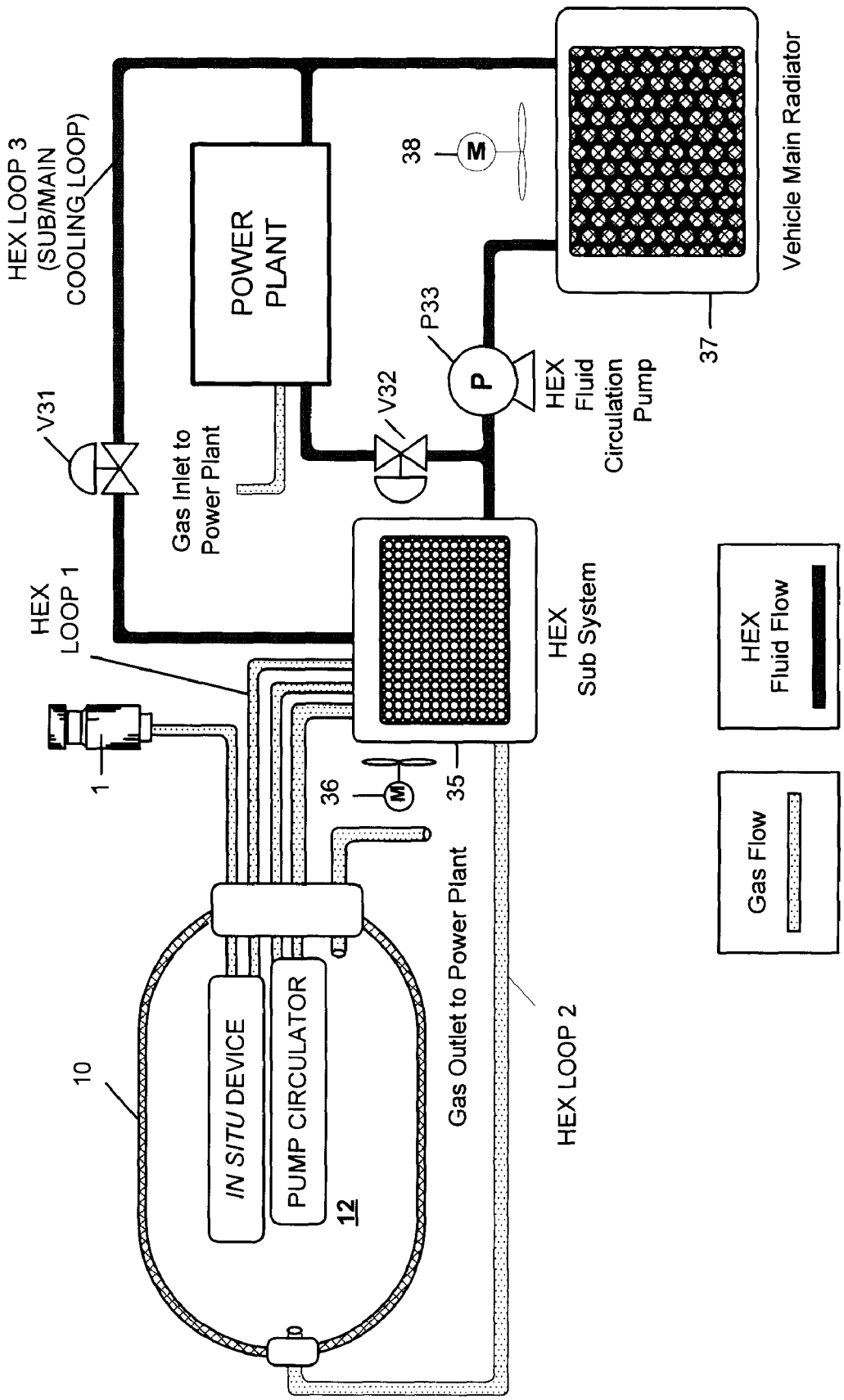
FIG. 3B shows in further detail the interconnection of the gas cooling circuit loops to a vehicle subsystem cooler HEX or to the main vehicle power plant cooling system HEX.
Figure 3C:
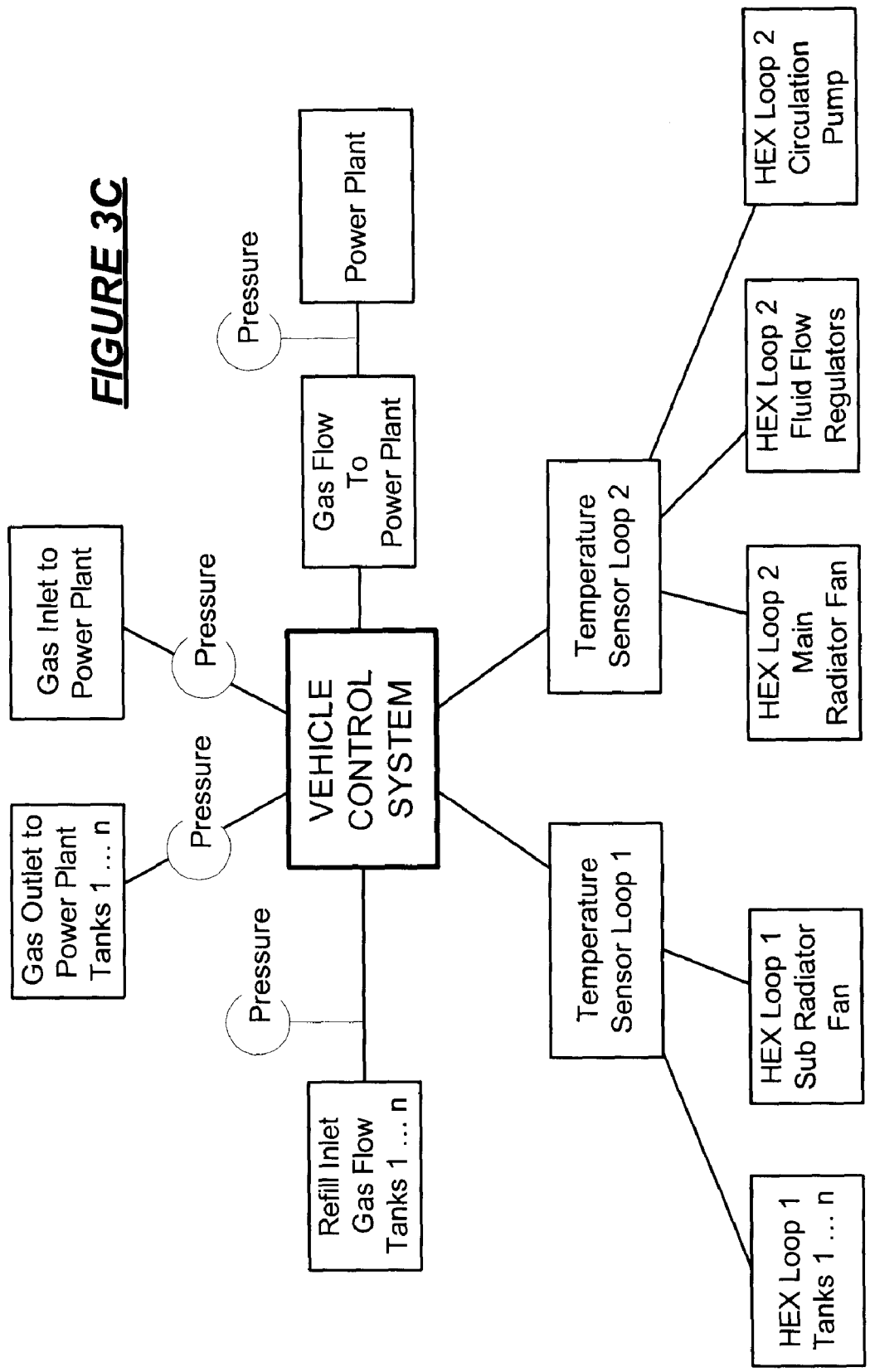
FIG. 3C shows a vehicle control system wherein temperature and pressure in gas flow components is monitored and regulated in the course of vehicle operation.
Figure 3D:
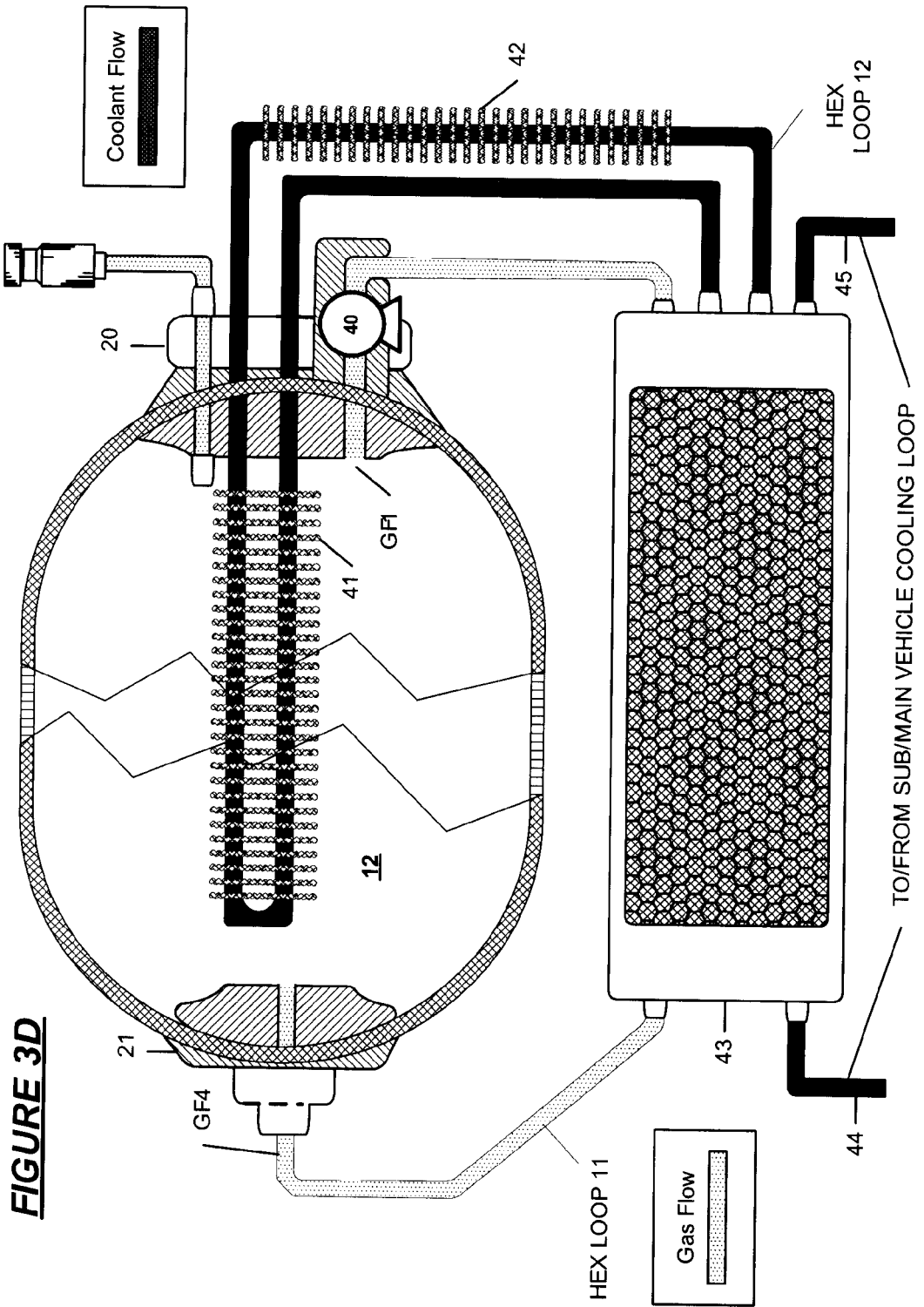
FIG. 3D shows an alternate configuration of HEX devices interconnected with a vehicle cooling system or sub system.

FIG. 3A illustrates the disposition of the gas flow heat exchange loop passing through the in situ device through HEX LOOP 1 and HEX LOOP 2 providing the supplemental cooling system for gas passing through the tank and the circulation pump into gas flow conduits or circuits in the same external heat exchanger or radiator 35 where the heat may be dissipated in place. Radiator 35 may be further cooled by a thermal interconnection with a main or sub vehicle cooling system through HEX circuit connections 36 and 37. FIG. 3B shows the interconnection of HEX LOOP 1 and HEX LOOP 2 passing through radiator 35 that is in turn thermally interconnected with HEX LOOP 3, the vehicle's power plant main or subsystem cooling loop. Radiator 35 is thermally interconnected with cooling fan 36. Valve/regulator V31 and valve/regulator V32 and pump P33 control the main vehicle thermal system which includes radiator 37 and fan 38. Operation of the system of FIG. 3B is controlled by the monitoring of temperature and pressure in the various loops and systems interconnected or integrated with the main vehicle control system as shown in FIG. 3C in accordance with design parameters. FIG. 3D illustrates an example wherein gas inflows from refill nozzle 1 directly into the tank volume 12 and is circulated in a gas HEX LOOP 11 through GF 1 and GF 4 at end caps 20 and 21 within the tank by pump 40. A second HEX LOOP 12 conveys a coolant media through in situ device 41 an external radiator 43 to provide additional heat exchange. HEX LOOP 11 and HEX LOOP 12 circulate through radiator 43 that may be interconnected to a main or sub vehicle thermal management system through inlets/outlets 44 and 45. As described above, separate HEX devices may be utilized for each HEX loop.

Figure 4A:
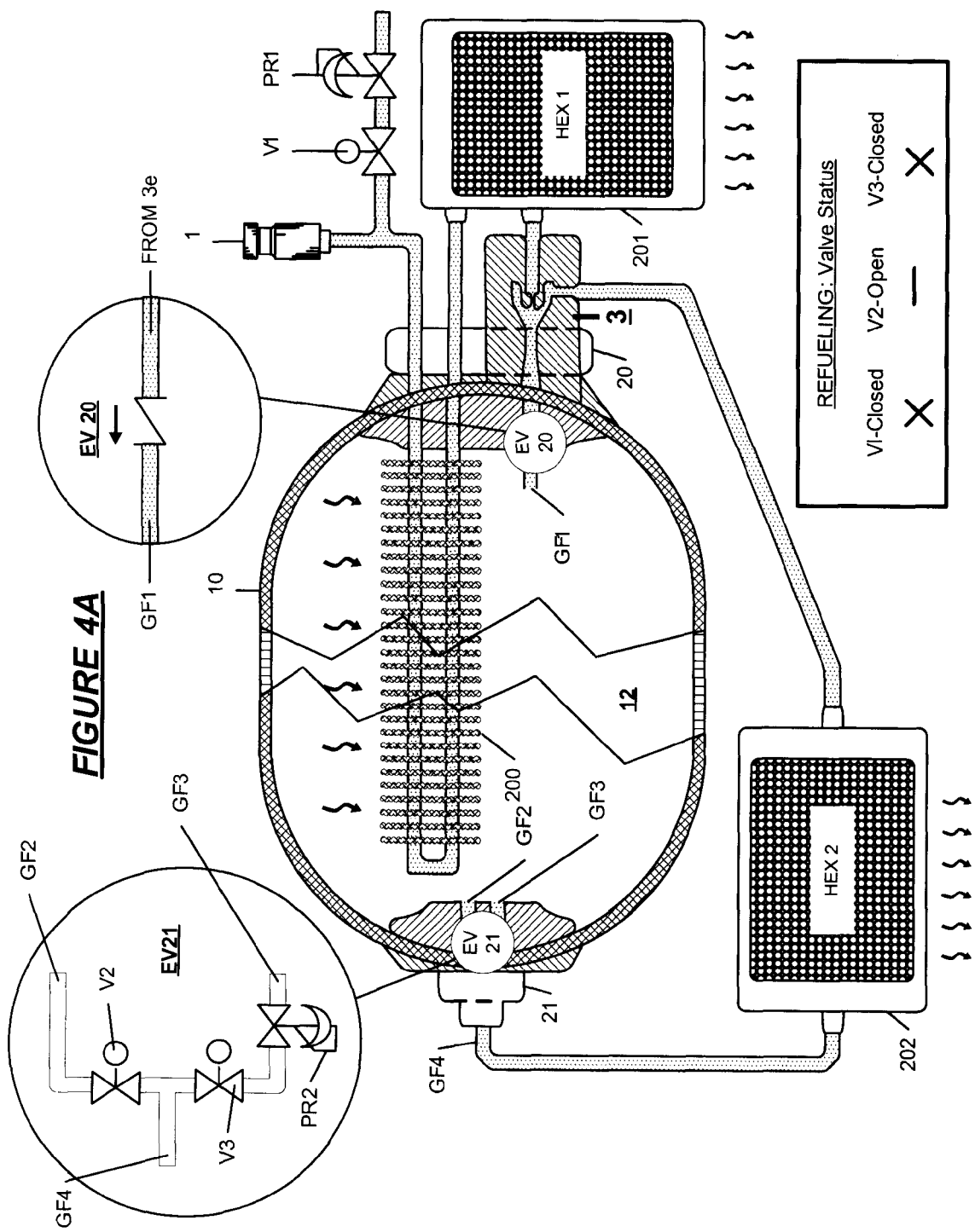
Figure 4C:
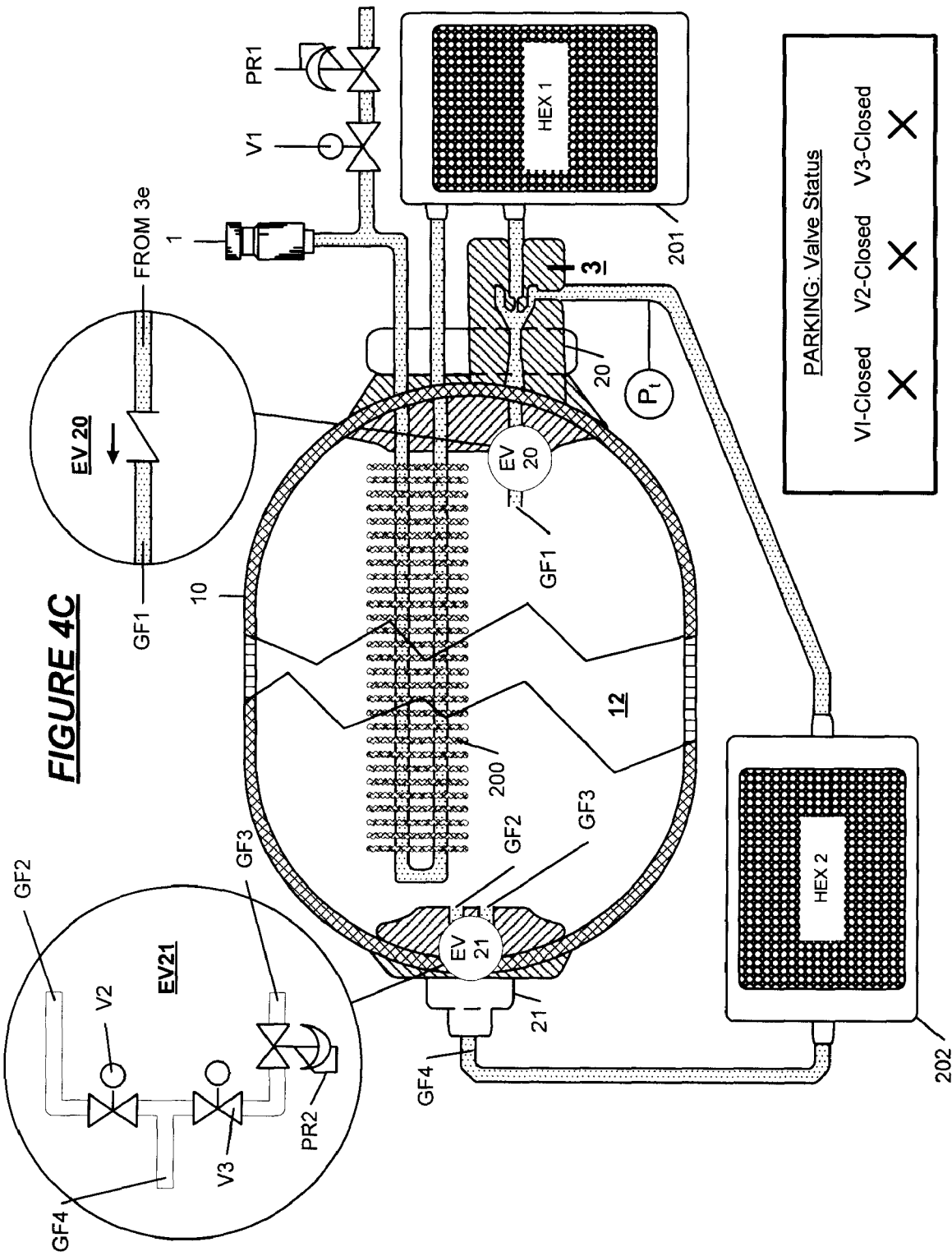

FIG. 4A, FIG. 4B and FIG. 4C illustrate, in a vehicle application, the respective modes: refilling, driving and parking. In each of FIG. 4A, FIG. 4B and FIG. 4C, a valve/gas flow switching and pressure regulator system is embedded in each of the end port assemblies 20 and 21, designated as EV 20 and EV 21. In situ heat exchanger 200, and ejector pump 3 with its components, nozzle, throat and outlet are evident from the drawing of FIG. 1A. Refill inlet system 1 is similarly numerically designated as with equivalent elements shown in FIG. 1A. The separate external heat exchangers HEX 1 and HEX 2 are indicated 201 and 202 with respective inlets/outlets in the gas flow circuit that are self evident in the drawings.

Although depicted as conventional radiator elements in the foregoing drawings, the heat exchangers utilized in the above examples may be supplemented or replaced by the vehicle sub frame cooling systems shown in FIG. 5A, FIG. 5B, FIG. 5C, FIG. 5D, FIG. 5E and FIG. 5F. FIG. 5A shows a circulating gas flow cooling line circuit 603 disposed within a vehicle frame component 602 surrounding tank 601 for circulating the gas about the tank sub frame. Frame cooling media, which will typically be air, is received in frame inlet 615 and exhausted through an outlet which may include a fan 635 or other active means for removing heat from the gas in line 603. In a closed cooling circuit, gas flows within a continuous circuit from the fuel tank circulating system through an inlet and outlet wherein "Gas Flow In" 610 is matched with a heat exchanger inlet connection 6 (FIG. 1A); "Gas Flow Out" from the frame radiator 620 is matched with heat exchanger outlet connection 8 (FIG. 1B) and the gas in the circulation loop returns to the tank gas circulation circuit. (Except as identifying flow in either direction, "in" and "out" designate the end connections of the circuit where the gas flow is connected to the HEX. Flow direction is not critical.) The heat from conduit line 603 is optionally radiated externally by air circulating in the frame driven by fan 635. In the absence of an air flow system, the frame body itself may be utilized as a heat sink for radiating or absorbing heat. The circulating gas flow circuit tube 603 may be formed as an extruded or molded interior conduit; however, it is preferable, whether the tube is within, upon, or otherwise a component of the sub frame assembly, that the gas circulation tube be a separate tube inserted within the frame assembly formed from a high conductivity high strength material such as a stainless steel alloy SUS, copper or aluminum. FIG. 5B and FIG. 5C respectively show examples of a cross sectional view and a side view of alternate configurations of gas flow tubes 603 in the frame 602. FIG. 5D illustrates an example wherein a heat pipe 690 interconnected with an internal HEX device assembled in tank 601 conducts heat to a vehicle frame element 602 thereby utilized as a heat sink. FIG. 5E and FIG. 5F show an example, respectively, in longitudinal cross section and in a front view cross section, wherein the gas circulation pipe 603 is installed within a cavity 603a in the vehicle frame 602 interior and radiator fins 690 (FIG. 5E) and 680 (FIG. 5F) are respectively transverse to the frame section and longitudinally coextending with the frame section. FIG. 5G illustrates a cross section of a sub frame assembly 700 with gas flow conduit therein 603 including a melting/solidifying media 710, such as naphthalene, packed within the frame section a component of the heat exchange system. See Gas Cooling Method Using a Melting/Solidifying Media for High Pressure Storage Tanks for Compressed Natural Gas or Hydrogen, Ser. No. 11/381,005 filed on May 1, 2006. In FIG. 5H, supplemental cooling conduits 711 and 712 convey cooling fluid from a supplemental cooler to the frame element 602 sub system wherein the conduit 603 is installed.

Figure 6A:
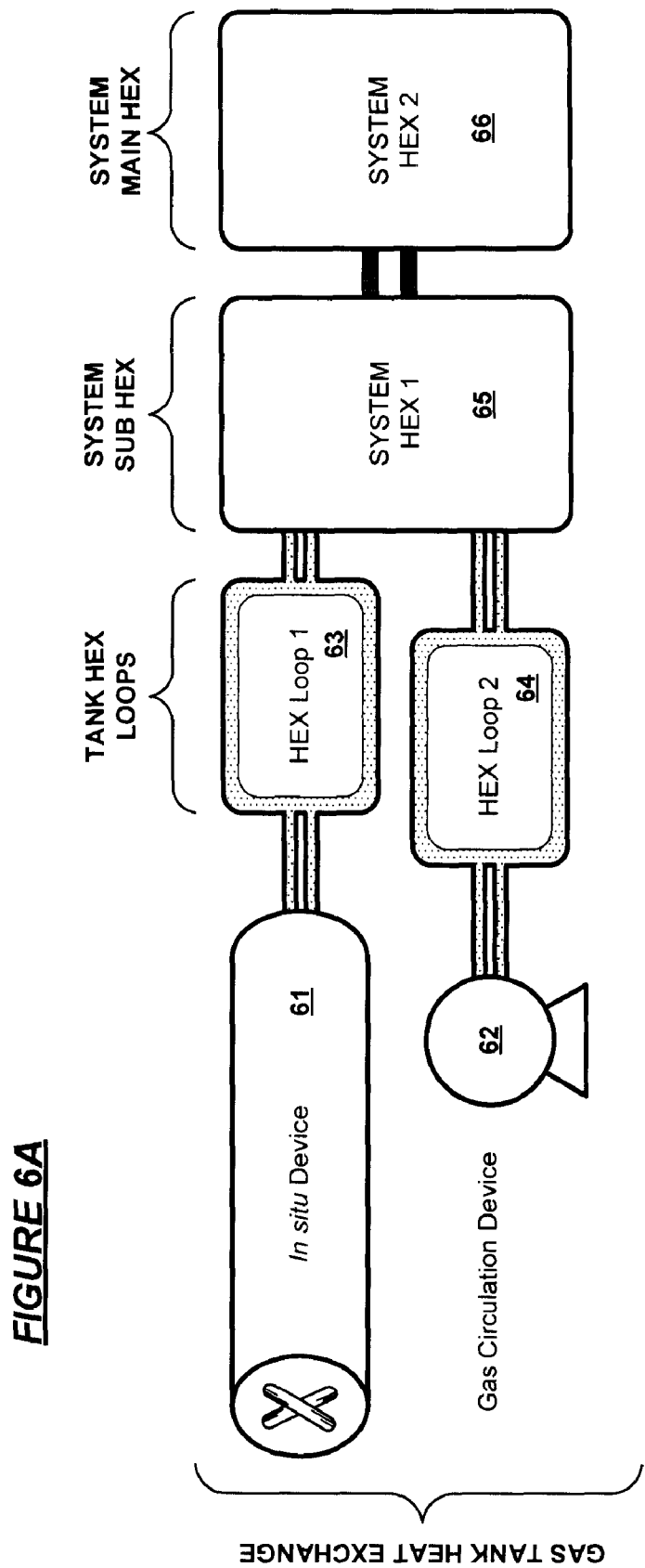
FIG. 6A illustrates the interconnection of gas flow heat exchangers with gas flow loops and system and sub system HEX devices.
Figure 6B:
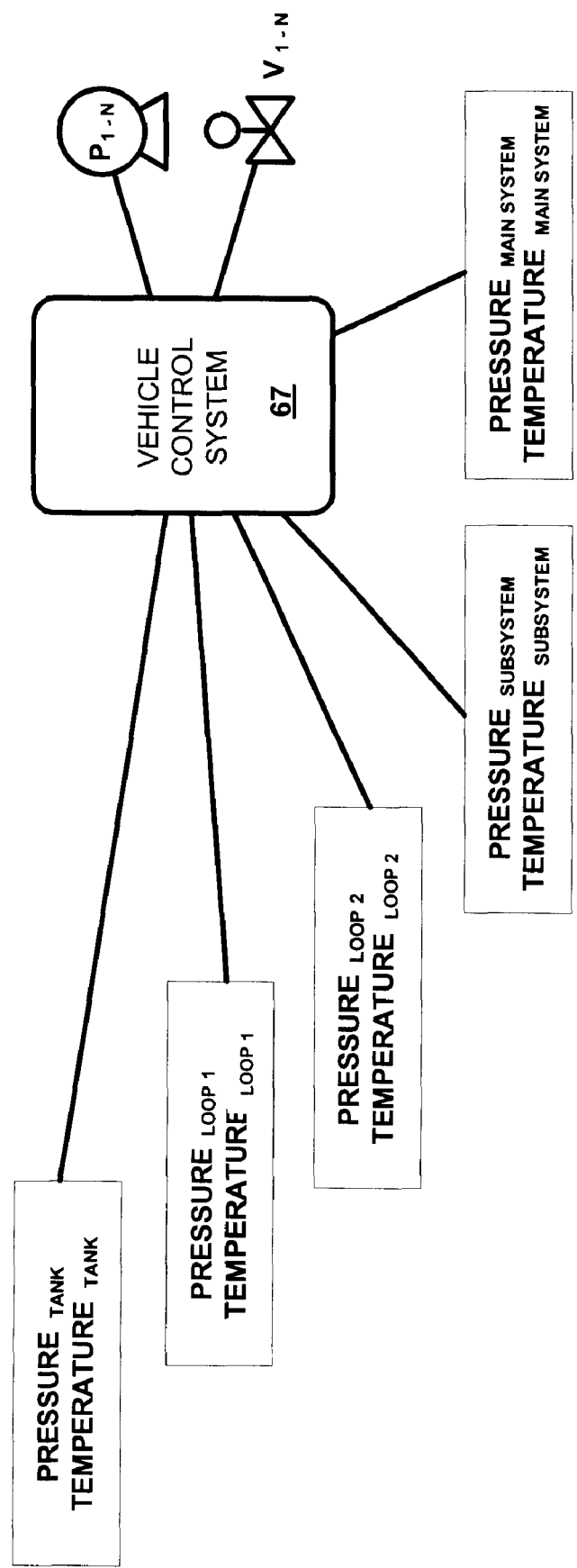
FIG. 6B illustrates the vehicle control system interconnected with temperature and pressure monitors and the valve and pump systems.

With reference to FIG. 6A, the cooling system management for a 70 MPa tank involves separate elements of heat transfer: 1) absorption of heat in the gas as the gas passes through an in situ a heat absorbing media 61 as the gas circulates from the refill nozzle through the tank to first cooling HEX loop 63; and 2) utilization of the heat absorbent properties of the gas itself as the gas is circulated by a pump or other device 62 through the tank to second cooling HEX loop 64. The first HEX loop 63 and second HEX loop 64 may be separately or jointly interconnected to a radiator or other heat absorber system in the vehicle 65, system HEX 1, which in turn may be interconnected with the main vehicle power plant system 66, system HEX 2. Various combinations and permutations of the foregoing thermal interconnections of the gas HEX loops and system HEX loops are possible. In FIG. 6B, temperatures and pressures (1) in the tank, PRESSURE$_{TANK}$ and TEMPERATURE$_{TANK}$; (2) in the first HEX loop, PRESSURE$_{LOOP\ 1}$ and TEMPERATURE$_{LOOP\ 1}$; (3) in the second HEX loop, PRESSURE$_{LOOP\ 2}$ and TEMPERATURE$_{LOOP\ 2}$; (4) in the subsystem, PRESSURE$_{SUBSYSTEM}$ and TEMPERATURE$_{SUBSYSTEM}$; and in the main cooling system, PRESSURE$_{MAIN}$ and TEMPERATURE$_{MAIN}$ are monitored and the various control pumps $P_{1-N}$ and valves $V_{1-N}$ are controlled by the vehicle control system 67 depending upon various parameters sensed, and desired, such as vehicle mode, refilling, decompression, driving, and parking, ambient temperature, tank pressure, volumetric gas flow and the like.

In a further example, the vehicle air conditioner may be utilized as a cooling sub system wherein, for example, with reference to FIG. 3A, the air conditioner cooling loop is thermally interconnected to conduits 36 and 37 in the HEX 35 that receives heat from an in situ device and a gas circulation pump system. Similarly, a heat mass already cooled by the air conditioner, such as a water reservoir, coolant or frame element can be utilized as a heat sink for indirect cooling of the gas interconnected in the manners shown in FIG. 5A through FIG. 5H. In another example adapted to the system of FIG. 3D, utilizing an air conditioner cooler, the cooled air conditioning fluid itself can be circulated within an in situ device 41 such as either directly, or indirectly by a separate HEX (shown) cooled by the air conditioner fluid circulation from inlets/outlets 44 and 45. A hybrid ambient air plus air conditioning system may also be used, wherein ambient air heat exchanger 42 pre cools the circulating fluid before the fluid enters the A/C subsystem. Likewise, the vehicle body or sub frame can be utilized as a cooling mass, interconnected with the tank cooling circuit as is the A/C system discussed above. (See FIG. 5A through FIG. 5H.)

The heat exchanger may be in the form of a radiator and may include fins, pins, plates, wave shaped radiators, mesh, corrugation like elements, or other like devices having high thermal conductivity and high surface area per unit volume or weight, allowing for the maximum thermal efficiency with regard to heat absorbed and heat radiated as described in my co-pending applications. The heat sink and radiator are each operatively disposed with regard to a fluid conduit system for the transfer of captured heat. Entropic flow of energy is from hot (within the tank) to cool (the radiator outside). The fluid flow in the conduit system that is encompassed by the heat sink or radiator, in an example, is in a continuous fluid loop, from the hot tank interior where the gas captures heat—to the radiator where conduit fluid is cooled—returning to the tank interior to begin the heat absorption/heat radiation cycle anew.

A fan or blower may be operatively disposed with respect to the heat exchanger—operatively dependent on factors such as radiator capacity, rate of heat transfer to the heat sink and the radiator, temperature of heat transferred, fan or blower (cubic feet per minute (cfm)) capacity effective at the radiator, temperature of the ambient external environment, and the like. A control system for the fan and or pump may be configured to interrelate the foregoing factors and determine appropriate fan and or pump speed, on and off timing, and the like.

Figure 7A:
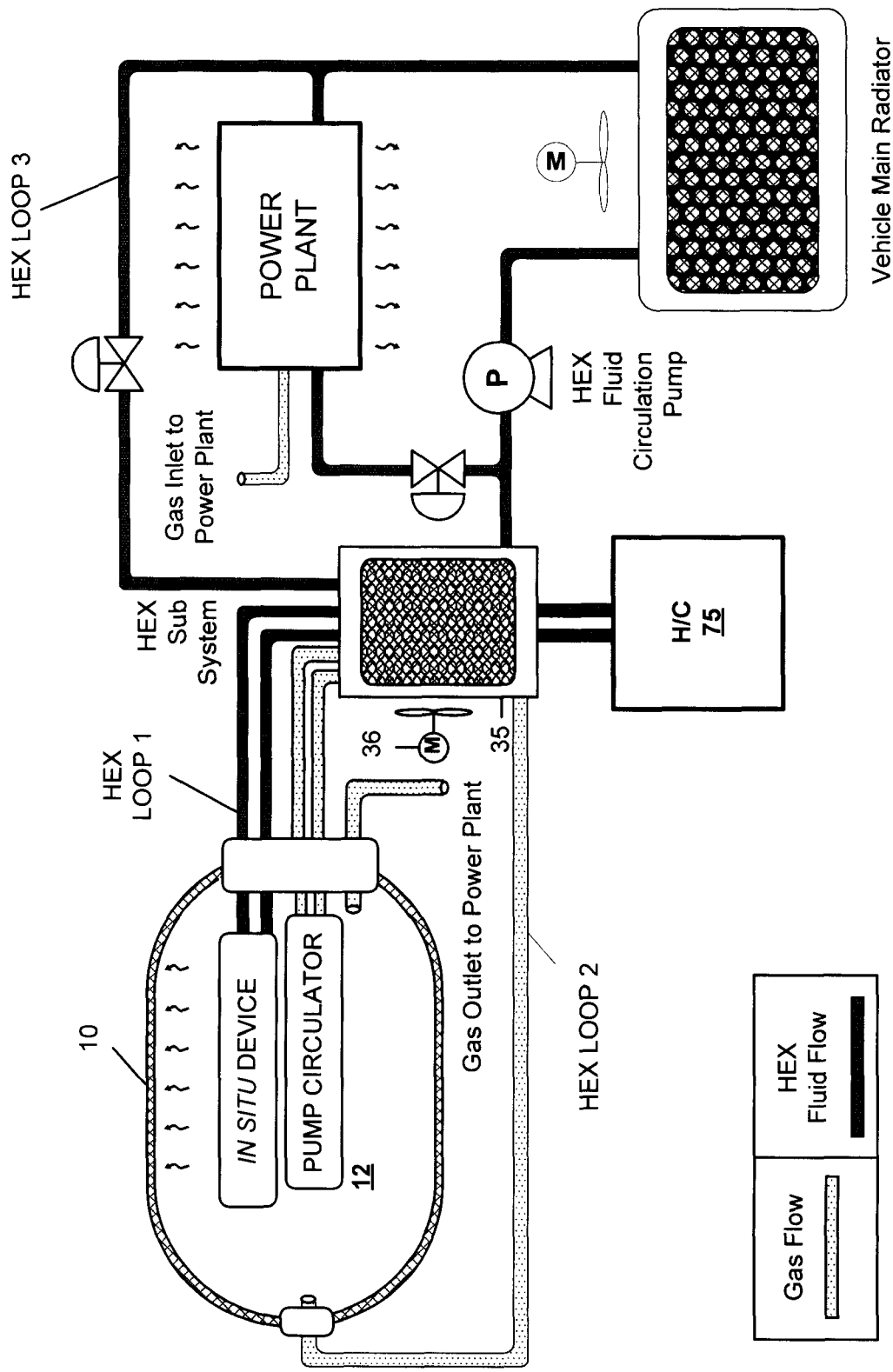
FIG. 7A is a schematic of the main and sub vehicle cooling systems interconnected with a heater/cooler and the gas flow HEX systems.
Figure 7B:
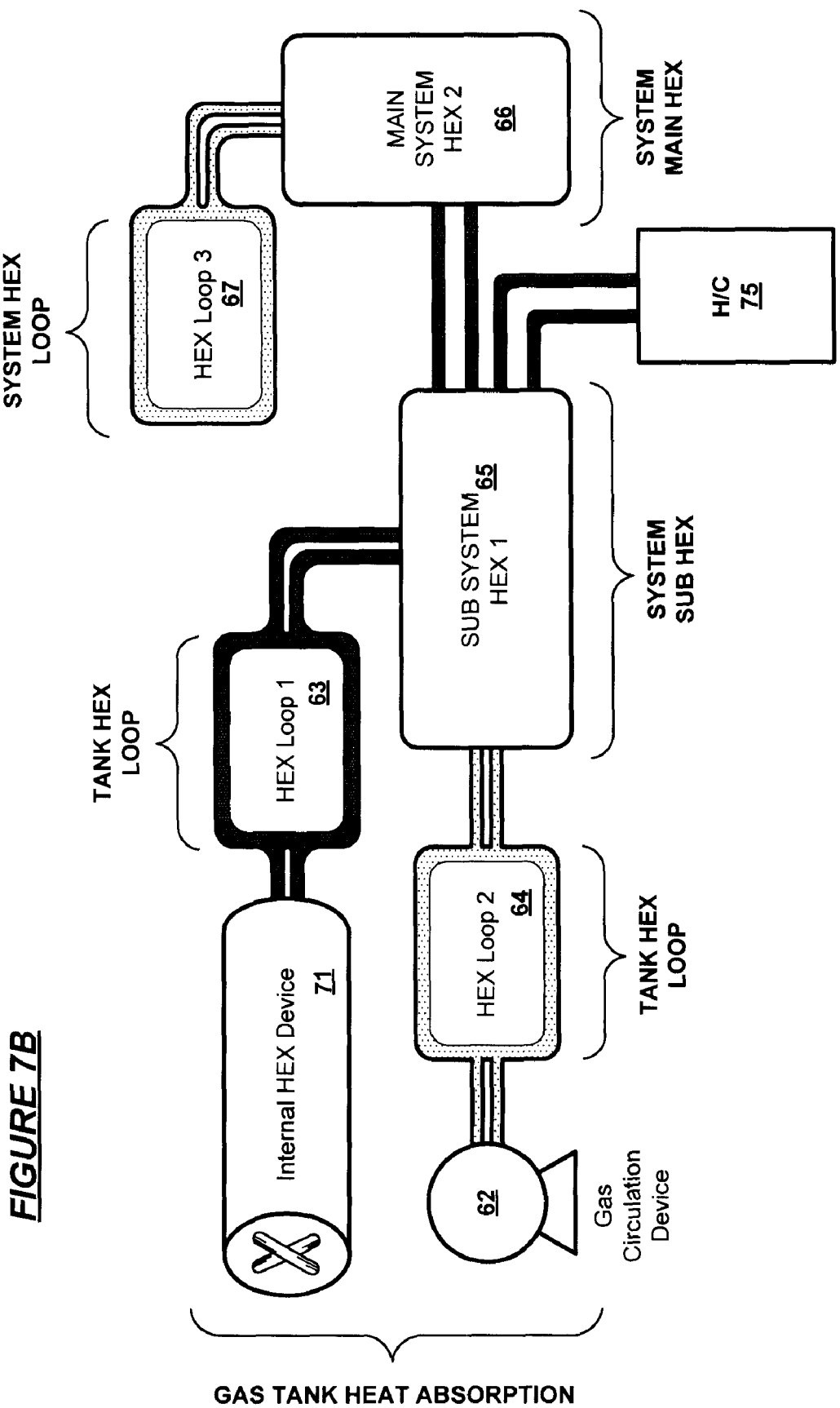
FIG. 7B illustrates, in the system of FIG. 7A, the interconnections of gas flow heat exchangers with gas flow loops and system and sub system HEX devices.
Figure 7C:
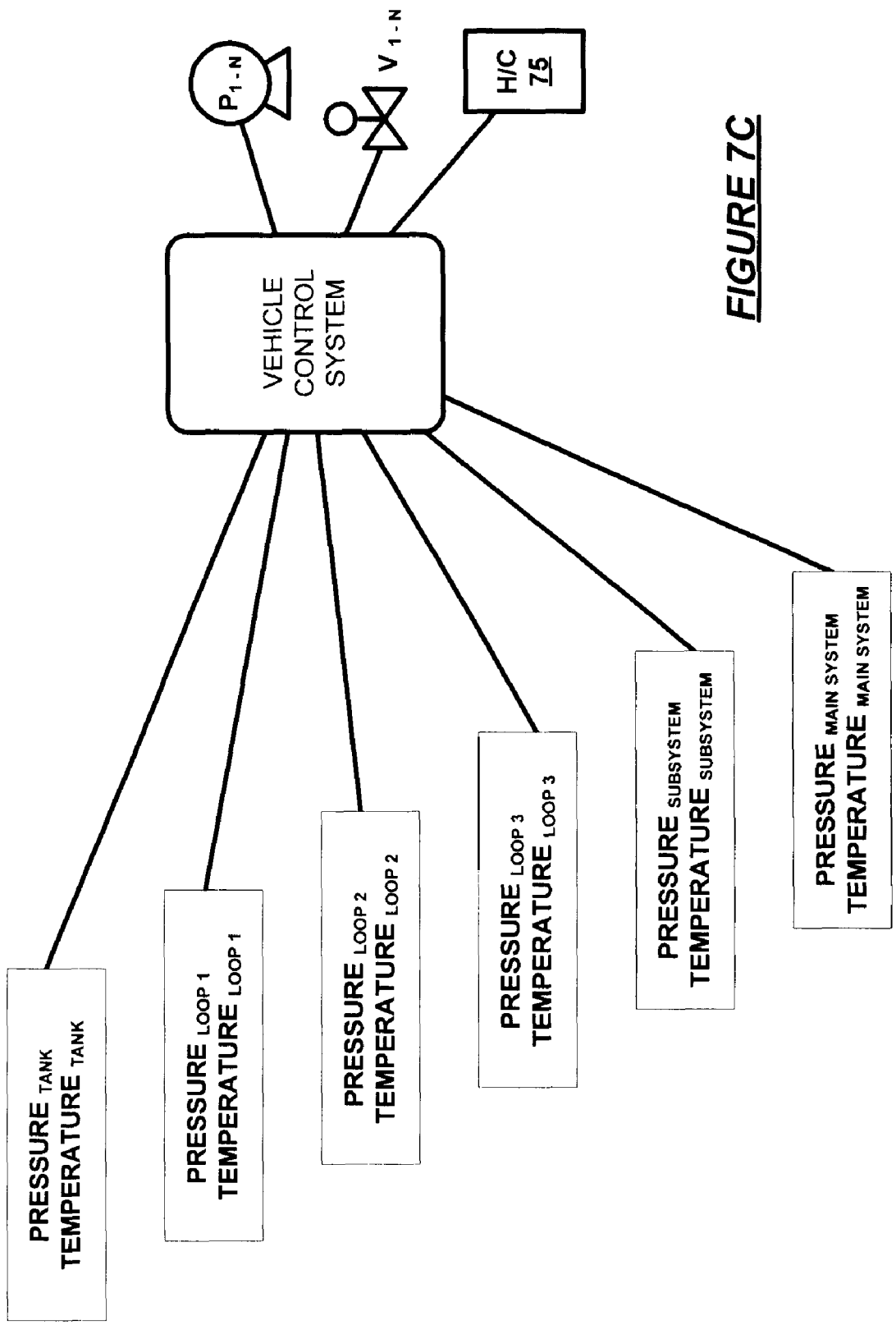
FIG. 7C illustrates vehicle control system interconnections of the system of FIG. 7A.

As with my previous applications noted above, the system is adaptable to multiple tanks and a vehicle control system providing selectable or controllable inlet valves and selectable or controllable outlet valves for the tanks and the coolant system operatively interconnected with a control means, logic circuit, or CPU on the vehicle. The vehicle control system also monitors pressure and/or temperature or other sensing means associated with the tanks or their inlet and outlet lines, the cooling fluid circulation lines, and the fluid pump and/or and may be adapted to control vehicle operation accordingly. Specific control configurations and parameters, and sensors, valve locations and systems in accordance with the principles of the invention are preferably based on overall vehicle design considerations. For example, pressure, temperature and other sensors and controls may be provided to monitor tank and/or line pressures and temperatures, to start, stop and adjust fluid flow, fan speed and duration, and other parameters associated with a proper operating protocol of the ejector pump and vehicle tank or valve system for refilling and consumption of pressurized fuel in the course of vehicle operation. As an additional benefit, the HEX devices utilized may be operated in the inverse, for example, during driving, when decompression of the stored gas lowers the tank gas temperature. As shown in FIG. 7A, a heater/cooler 75 may be an element of the HEX system and/or power plant and air conditioner heat exhaust may be utilized in a direct or indirect heating loop to warm gas during vehicle operation to provide an added enhancement of vehicle range extension as the fuel in the tank will be more completely evacuated in comparison with a situation where residual gas is left cold and unwarmed. When used for cooling, the vehicle air conditioner will be on during refueling. FIG. 7B illustrates, in the system of FIG. 7A, the interconnections of gas flow heat exchangers with gas flow loops and system and sub system HEX devices. Vehicle tank devices, internal HEX 71 and gas circulation device 62, are respectively interconnected with tank HEX Loop 1, 63, and tank HEX Loop 2, 64, and are in turn thermally interconnected with a sub system HEX 65 thermally engaged with heater/cooler 75. Main system HEX Loop 3 is shown engaged with the main system HEX 2, 66, which may, for example, be the main vehicle radiator. FIG. 7C illustrates vehicle control system interconnections of the system of FIG. 7A with monitors for temperature and pressure associated with the tank, the HEX loops, system and sub system cooling/heating devices interconnected with the vehicle control system for regulation of the heater/cooler, valves and pumps otherwise associated with the devices monitored.

FIG. 8A shows heat from the power plant, from the air conditioner exhaust, from a supplemental heater, and from a frame or sub frame member transferred to the in situ device 71 within the tank 10 through a direct connection, such as a heat pipe (FIG. 5D) or a thermally conductive fluid circuit such as is shown in the drawings herein. In FIG. 8B, a coolant system is interconnected with the in situ device 71. FIG. 8C shows a configuration wherein heat is transferred indirectly to gas within the tank through a supplemental HEX 80 interposed between the power plant, the air conditioner exhaust, a supplemental heater, or the frame or sub frame member and the in situ device 71 within the tank 10; and FIG. 8D shows an inverse configuration wherein the in situ device is thermally connected through an intermediate HEX device 80 to vehicle cooling sources. Thus, the systems for heat transfer, whether heat absorption in the tank for cooling, heat radiation in the tank for warming, heat absorption from a source exterior to the tank for gas warming, or heat radiation from a source exterior to the tank for gas cooling are essentially interchangeable in function and equivalent in structural purpose within design limits. A thermally absorbent heating—cooling media such as naphthalene is both a heater and cooler device. Heat transfer may be accomplished by a gas or fluid flow conduit circuit of a heat pipe. See the systems and devices referenced in my applications for patent identified as "Related Applications" in Ser. No. 11/682,574 filed on Mar. 6, 2007.

With reference to the embodiments discussed above as examples, there is provided an apparatus wherein the compression heat of refueling of a high pressure storage tank is evacuated from the interior of the tank in which a gas circulating within the tank passes through an ejector pump powered by the mechanical energy of the refueling gas as the gas traverses from the high pressure refuel depot to the storage tank and the circulating gas absorbs the refueling heat and carries the heat to a cooling system before the gas is introduced into the tank for storage and the obverse thermal management occurs wherein gas is heated for better tank evacuation while driving.

In all instances described herein, it is assumed that during the state of refueling, the outlet valves for each tank are closed; and during the instance of consumption, the inlet valves for each tank are closed and the cooling fluid correspondingly circulated in a manner typically monitored and controlled by a vehicle operation system. The on board vehicle tank system may include a plurality of on board tanks that may have a filling sequence wherein all tanks are filled in parallel simultaneously or all tanks are filled separately in a series order essentially one at a time.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A tank for the high pressure storage of a fuel gas wherein the tank is adapted to be refueled under high pressure at a refueling depot, including 1) a fuel gas, the fuel gas comprising a heat absorbent media that circulates within the tank and absorbs the gas heat of compression resulting from the increase in pressure within the tank caused by the refueling of the on board tank, 2) a flow path for the fuel gas directing the gas having absorbed the heat to circulate to a heat exchanger external to the tank whereby the heat absorbed by the gas is exhausted from the tank to an environment external to the tank, and 3) a pump that is interposed between the high pressure gas depot refilling line and the tank, comprising a source of power for the circulation of the fuel gas.

2. The apparatus of claim 1 wherein the pump is a Venturi pump interconnected in a closed circuit conduit system from a refuel gas inlet to the circulation flow to the external heat exchanger.

3. The apparatus of claim 1 wherein the circulation flow includes an auxiliary blower operatively disposed with respect to the external heat exchanger for cooling the fuel gas in the circulation flow.

4. The apparatus of claim 1 wherein the external heat exchanger is selected from at least one of a radiator and a heat sink and a coolant media.

5. The apparatus of claim 1 wherein the external heat exchanger includes a closed loop gas flow circuit passing through a first radiator that is thermally interconnected with a second radiator associated with a vehicle power plant system that includes a circulating coolant fluid.

6. Apparatus in accordance with claim 1 wherein the heat exchanger is a radiator comprising 1) a configuration of heat disposing elements on a vehicle frame assembly and 2) a circulation loop for the gas within the vehicle frame assembly proximate the heat disposing elements.

7. An on board vehicle tank system in accordance with any one or more of claim 1 or claim 2 or claim 3 or claim 4 or claim 5 or claim 6 including a plurality of on board tanks.

8. Apparatus in accord with claim 7 wherein the filling sequence for the plurality of tanks is 1) all tanks are filled in parallel simultaneously, or 2) all tanks are filled separately in a series order essentially one at a time.

9. A heating system for a high pressure fuel gas storage tank comprising 1) a fluid flow circuit for the gas directing gas to flow through an in situ heat exchange device within the tank, 2) a heat exchange device external to the tank whereby heat is absorbed from an environment external to the tank, and 3) an interconnection between the in situ heat exchanger and the heat exchange device external to the tank such that the heat absorbed by the gas flowing through the external heat exchange device is transferred to the in situ device in the tank.

10. The heating system of claim 9 wherein heat from at least one of a vehicle power plant, an air conditioner exhaust, a supplemental heater, and a vehicle frame or sub frame member is transferred to the in situ device within the tank through a direct connection.

11. The heating system of claim 10 wherein the direct connection is a heat pipe.

12. The heating system of claim 10 wherein the direct connection is a thermally conductive fluid circuit.

13. The heating system of claim 1 wherein heat from at least one of the vehicle power plant, the air conditioner exhaust, the supplemental heater, and the vehicle frame or sub frame member is absorbed by and transferred to the in situ device within the tank through an indirect connection through a heat exchange device between the in situ device and the at least one of the vehicle power plant, the air conditioner exhaust, the supplemental heater, and the vehicle frame or sub frame member.

14. A high pressure storage tank system for a fuel gas wherein the tank is adapted to be refueled under high pressure at a refueling depot, including 1) a fuel gas, the fuel gas comprising a heat absorbent media that circulates within the tank, 2) a flow path for the fuel gas directing the gas from the tank interior to a radiator external to the tank whereby heat is exchanged in the gas as a result of the temperature difference between the tank interior and the external radiator and the circulation of the gas through the external radiator and the tank interior.

15. The heating system of claim 14 further including 1) a first heat exchanger internal to the tank; 2) a second heat exchanger external to the tank; 3) a gas flow circuit for the gas directing gas to flow through the first heat exchanger inside the tank to the second heat exchanger external the tank.

* * * * *